(12) United States Patent
Motoyama et al.

(10) Patent No.: US 7,647,397 B2
(45) Date of Patent: Jan. 12, 2010

(54) METHOD AND APPARATUS FOR MODIFYING REMOTE DEVICES MONITORED BY A MONITORING SYSTEM

(75) Inventors: Tetsuro Motoyama, Cupertino, CA (US); Avery Fong, Castro Valley, CA (US)

(73) Assignee: Ricoh Company Ltd., Tokyo (JP)

( * ) Notice: Subject to any disclaimer, the term of this patent is extended or adjusted under 35 U.S.C. 154(b) by 502 days.

(21) Appl. No.: 10/157,903

(22) Filed: May 31, 2002

(65) Prior Publication Data

US 2003/0177227 A1    Sep. 18, 2003

Related U.S. Application Data

(60) Provisional application No. 60/359,648, filed on Feb. 27, 2002.

(51) Int. Cl.
 *G06F 15/173* (2006.01)
 *G06F 15/177* (2006.01)
 *G06F 17/00* (2006.01)

(52) U.S. Cl. .............. 709/224; 709/221; 707/103 R

(58) Field of Classification Search ............... 709/221, 709/224, 220, 223; 707/103 R, 103 X
See application file for complete search history.

(56) References Cited

U.S. PATENT DOCUMENTS

| | | | | |
|---|---|---|---|---|
| 5,436,909 A * | 7/1995 | Dev et al. | ................. | 714/4 |
| 5,832,503 A * | 11/1998 | Malik et al. | ................. | 709/223 |
| 6,122,639 A * | 9/2000 | Babu et al. | ................. | 707/103 R |
| 6,202,210 B1 * | 3/2001 | Ludtke | ................. | 725/20 |
| 6,324,656 B1 * | 11/2001 | Gleichauf et al. | ................. | 714/37 |
| 6,816,897 B2 * | 11/2004 | McGuire | ................. | 709/223 |
| 6,868,428 B2 * | 3/2005 | Todokoro et al. | ................. | 707/203 |
| 2002/0161867 A1 * | 10/2002 | Cochran et al. | ................. | 709/221 |
| 2003/0005092 A1 * | 1/2003 | Nelson et al. | ................. | 709/220 |

FOREIGN PATENT DOCUMENTS

| | | |
|---|---|---|
| DE | 100 22 491 | 11/2001 |
| JP | 2000-196665 | 7/2000 |

OTHER PUBLICATIONS

U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.

(Continued)

*Primary Examiner*—J Bret Dennison
*Assistant Examiner*—Asghar Bilgrami
(74) *Attorney, Agent, or Firm*—Oblon, Spivak, McClelland, Maier & Neustadt, L.L.P.

(57) ABSTRACT

A method and apparatus for monitoring at least one network connected device (monitored device) using a controller is disclosed. More specifically, a method of modifying monitored devices supported by the monitoring system includes updating information stored in a system support database (SSD) if the information stored in the SSD is insufficient to support the monitored device. The updating step is performed without reprogramming the monitoring system, thereby allowing flexibility in modifying the monitored devices supported by the monitoring system.

10 Claims, 16 Drawing Sheets

OTHER PUBLICATIONS

U.S. Appl. No. 11/234,323, filed Sep. 26, 2005, Motoyama et al.
U.S. Appl. No. 11/517,363, filed Sep. 8, 2006, Motoyama, et al.
U.S. Appl. No. 11/517,430, filed Sep. 8, 2006, Motoyama, et al.
U.S. Appl. No. 11/517,362, filed Sep. 8, 2006, Motoyama, et al.
U.S. Appl. No. 11/517,378, filed Sep. 8, 2006, Motoyama, et al.
U.S. Appl. No. 11/517,428, filed Sep. 8, 2006, Motoyama, et al.
U.S. Appl. No. 11/153,543, filed Jun. 16, 2005, Motoyama et al.
U.S. Appl. No. 11/032,039, filed Jan. 11, 2005, Motoyama et al.
U.S. Appl. No. 11/032,192, filed Jan. 11, 2005, Motoyama et al.
U.S. Appl. No. 11/032,016, filed Jan. 11, 2005, Motoyama et al.
U.S. Appl. No. 11/032,063, filed Jan. 11, 2005, Motoyama et al.
U.S. Appl. No. 11/032,088, filed Jan. 11, 2005, Motoyama et al.
U.S. Appl. No. 11/913,337, filed Aug. 9, 2004, Motoyama et al.
U.S. Appl. No. 11/927,283, filed Aug. 27, 2004, Motoyama et al.
U.S. Appl. No. 11/913,364, filed Aug. 9, 2004, Motoyama et al.
U.S. Appl. No. 11/913,431, filed Aug. 9, 2004, Motoyama et al.
U.S. Appl. No. 11/927,158, filed Aug. 27, 2004, Motoyama et al.
U.S. Appl. No. 11/913,450, filed Aug. 9, 2004, Motoyama et al.
U.S. Appl. No. 11/927,257, filed Aug. 27, 2004, Motoyama et al.
U.S. Appl. No. 10/764,582, filed Jan. 27, 2004, Motoyama et al.
U.S. Appl. No. 10/764,467, filed Jan. 27, 2004, Motoyama et al.
U.S. Appl. No. 10/764,569, filed Jan. 27, 2004, Motoyama et al.
U.S. Appl. No. 10/764,527, filed Jan. 27, 2004, Motoyama et al.
U.S. Appl. No. 10/670,505, filed Sep. 26, 2003, Motoyama.
U.S. Appl. No. 10/670,604, filed Sep. 26, 2003, Motoyama.
U.S. Appl. No. 10/460,408, filed Jun. 13, 2003, Motoyama et al.
U.S. Appl. No. 10/460,150, filed Jun. 13, 2003, Motoyama et al.
U.S. Appl. No. 10/460,404, filed Jun. 13, 2003, Motoyama et al.
U.S. Appl. No. 10/460,151, filed Jun. 13, 2003, Motoyama et al.
U.S. Appl. No. 10/372,939, filed Feb. 26, 2003, Motoyama.
U.S. Appl. No. 10/328,008, filed Dec. 26, 2002, Motoyama et al.
U.S. Appl. No. 10/328,026, filed Dec. 26, 2002, Motoyama et al.
U.S. Appl. No. 10/328,003, filed Dec. 26, 2002, Motoyama et al.
U.S. Appl. No. 09/975,935, filed Oct. 15, 2001, Pending.
U.S. Appl. No. 10/225,290, filed Aug. 22, 2002, Pending.
U.S. Appl. No. 09/756,120, filed Jan. 9, 2001, Pending.
U.S. Appl. No. 09/953,358, filed Sep. 17, 2001, Pending.
U.S. Appl. No. 10/068,861, filed Feb. 11, 2002, Pending.
U.S. Appl. No. 10/142,989, filed May 13, 2002, Pending.
U.S. Appl. No. 10/157,902, filed May 31, 2002, Pending.
U.S. Appl. No. 60/359,648, filed Feb. 27, 2002, Pending.
U.S. Appl. No. 10/157,904, filed May 31, 2002, Pending.
U.S. Appl. No. 10/162,402, filed Jun. 5, 2002, Pending.
U.S. Appl. No. 10/157,905, filed May 31, 2002, Pending.
U.S. Appl. No. 11/940,785, filed Nov. 15, 2007, Motoyama, et al.
U.S. Appl. No. 11/960,248, filed Dec. 19, 2007, Motoyama, et al.
U.S. Appl. No. 11/867,741, filed Oct. 5, 2007, Motoyama et al.
Masayki Yamai, All About Network Management Techniques (practice), pp. 90-133, Chapter 5: SNMP-based Network Management, Open Design No. 10, Second Edition, Japan, CQ Publishing Co., Ltd., Jun. 15, 1997, with partial translation of pp. 95-96.
U.S. Appl. No. 12/030,623, filed Feb. 13, 2008, Motoyama, et al.
U.S. Appl. No. 12/062,146, filed Apr. 3, 2008, Motoyama, et al.

* cited by examiner

METHOD AND APPARATUS FOR MODIFYING REMOTE DEVICES MONITORED BY A MONITORING SYSTEM

CROSS REFERENCES TO RELATED APPLICATIONS

This application is related to the following commonly owned co-pending applications: U.S. patent application Ser. No. 10/068,861, filed Feb. 11, 2002, entitled "Method and Apparatus Utilizing Communication Means Hierarchy to Configure or Monitor an Interface Device", U.S. patent application Ser. No. 10/142,989, filed May 13, 2002, entitled "Verification Scheme for Email Message Containing Information About Remotely Monitored Devices"; U.S. patent application Ser. No. 09/756,120, filed Jan. 9, 2001, entitled "Method and System of Remote Support of Device Using Email," the disclosures of which are herein incorporated by reference in their entirety. The present utility application also claims the benefit of U.S. patent application Ser. No. 60/359,648 filed Feb. 27, 2002 entitled "Architecture of the Remote Monitoring of Devices Through the Local Monitoring Station and Sending to the Central Station in Which the Multiple Vendors Are Supported" the disclosure of which is also incorporated herein by reference in its entirety.

BACKGROUND OF INVENTION

1. Field of Invention

The present invention relates to monitoring, configuration or installation of hardware on a computer system.

2. Discussion of the Background

In general, computer systems include hardware and software. Hardware is the actual physical computing machinery, while software is the list of instructions to operate the hardware. Typically, computer systems will include a variety of hardware devices that interface with one another. When hardware devices interface with one another, it is necessary for the software which operates the hardware to be configured to allow communication between the hardware devices, so that the hardware devices can operate cooperatively. It is also desirable for hardware devices to be monitored. For the purposes of discussion, a hardware device that is configuring or monitoring will be referred to as a controlling device. Likewise, for the purposes of discussion, the hardware device that is being configured to operate cooperatively or being monitored by the controlling device will be referred to as an interfacing device.

When hardware devices initially interface with one another, it is common for the software that operates the devices to remain unconfigured to allow cooperative operation. Accordingly, a significant part of installing computer hardware devices collectively configure the software. In some arrangements, a user must configure the computer hardware manually by opening the computer hardware and physically setting jumpers or dip switches. In still some further arrangements, the installation process includes a user loading software from a floppy disk to configure the hardware devices. There have also been attempts for computer hardware devices to include software that can automatically configures hardware devices. There are, however, some apparent disadvantages and deficiencies with respect to the above-identified approaches.

One disadvantage is that automatic hardware installation software is limiting in its ability to adapt to new devices or to new manufacturers that were not specifically programmed into the software. In the prior art, if the controlling device does not recognize the specific model of the interfacing device, automatic configuration is not possible. In other words if the controlling device is not programmed to anticipate the model of an interfacing device, then automatic hardware configuration will not be successful. In such a circumstance, a user will have to manually install the configuration communication means to the hardware devices.

Another disadvantage of the prior art is that the controlling device is unable to partially configure hardware devices if the particular model of the interfacing device cannot be identified. In other words, if a controlling device cannot identify a specific model of the interfacing device, then the interfacing device will not be configured to function cooperatively. This results in the unconfigured interfacing device being inoperable and essentially useless.

It is desirable for hardware devices located on a network to be monitored for maintenance, usage, or other purposes. However, it has been difficult for a controlling device to communicate with various interfacing devices on a network given the different communication means between manufacturers and models of interfacing devices. These disadvantages prevent network administrators from obtaining crucial information about the performance and efficiency of interfacing devices on a network.

SUMMARY OF THE INVENTION

The present invention relates to a method and apparatus for modifying devices supported by a monitoring system using a system support database. More specifically, a method of modifying monitored devices supported by the monitoring system includes updating information stored in a system support database (SSD) if the information stored in the SSD is insufficient to support the monitored device. The updating step is performed without reprogramming the monitoring system, thereby allowing flexibility in modifying the monitored devices supported by the monitoring system.

In exemplary embodiments of the present invention, a plurality of databases are used to configure devices with systems. These embodiments are advantageous, as valuable computer resources are used during the initialization of the devices with a system while preserving the computer resources during system operation. For example, a system may utilize two separate databases when a device is being configured. The first database (i.e. a System Configuration Database) stores device information for devices that have already been configured to the system and wherein operational status information of the devices is stored as the devices are being monitored by the system. Such device information may include the manufacturer name, and model name while operational status information may include the page count and toner level.

The device information stored in the first database is utilized during the initialization of the system while the status information stored in the first database is accumulated during the system operation. The first database, therefore, will be large since it will contain status information. Consumption of computer resources is, however, minor since the device information is used during initialization while status information is only added when the system is in operation.

In an exemplary embodiment of the present invention, the system of the present invention also utilizes a second database (i.e. a System Support Database). This second database may be relatively large as it would include data pertaining to a plurality of devices. When a device is initialized with a system, and the system is not yet configured to interface with the device, then the first database (i.e. System Configuration Database) can be updated using the information from the second database (i.e. System Support Database) so that the device can interface with the system. Due to the large amount of information stored, querying the second database is not only time consuming but also uses a large amount of valuable computer resources. Once, the critical information (i.e. protocol) relating the device is updated in the first database with information from the second database, only the first database is utilized.

In one aspect, the present invention provides in a network based system having a monitoring system and a plurality of monitored devices communicatively coupled via a network, the monitoring system communicatively coupled to first and second databases, a method of modifying monitored devices supported by the monitoring system. The method includes determining if the monitoring system is configured to interface with a monitored device among said plurality of monitored devices; obtaining configuration information from the monitored device if the monitoring system is not configured to interface with the monitored device; determining if the monitored device is supported by the monitoring system using information stored in the second database; and updating information stored in the second database if said information is insufficient to support the monitored device, the updating step is performed without reprogramming the monitoring system, thereby allowing flexibility in modifying the monitored devices supported by the monitoring system. The monitored devices can be one of a printer, scanner, digital copier, stamp machine, or household appliance.

The method further includes updating configuration information, for the monitored device, stored in the first database with information from the second database to enable the monitoring system to interface with the monitored device. The step of updating information stored in the second database includes updating manufacturer information for monitored devices, the manufacturer information stored in a first table of the second database; updating model information for the monitored devices, the model information stored in a second table of the second database. The step of determining if the monitored device is supported by the monitoring system is performed by reading information stored in the first and second tables.

The method further includes storing in the first table information related to an enterprise object identifier for a manufacturer of a monitored device; an object identifier used for determining a model name of the monitored device; and an object identifier for determining a unique identifier of the monitored device. The second table is preferably stored with model information in association with corresponding manufacturer information for a monitored device. The second database is a system support database.

The step of obtaining configuration information from the monitored device includes identifying at least one of (i) manufacturer, (ii) model, and (iii) unique identifier of the monitored device. The configuration information is preferably only used during initialization of the monitoring system to identify a monitored device that requires monitoring. The step of determining if the monitoring system is configured to interface with the monitored device includes querying the first database with at least one of manufacturer, model, and unique identifier of the monitored device.

The step of determining if the monitoring system is configured to interface with the monitored device comprises querying the monitored device with data stored in the first database. The first database is a system configuration database and comprises information for enabling communication between the monitoring system and the monitored device; and status information related to the monitored device, the status information being added after initialization of the monitoring system.

The step of determining if the monitored device is supported by the monitoring system includes obtaining status information of the monitored device if the manufacturer and model of the monitored device are supported by the monitoring system. The monitored device includes hardware or software components.

In another aspect, the present invention provides in a network based system having a monitoring system and a plurality of monitored devices communicatively coupled via a network, the monitoring system communicatively coupled to first and second databases, an apparatus for modifying monitored devices supported by the monitoring system includes means for determining if the monitoring system is configured to interface with a monitored device among said plurality of monitored devices; means for obtaining configuration information from the monitored device if the monitoring system is not configured to interface with the monitored device; means for determining if the monitored device is supported by the monitoring system using information stored in the second database; and means for updating information stored in the second database if said information is insufficient to support the monitored device, the updating step is performed without reprogramming the monitoring system, thereby allowing flexibility in modifying the monitored devices supported by the monitoring system.

In yet another aspect, the present invention provides in a network based system having a monitoring system and a plurality of monitored devices communicatively coupled via a network, the monitoring system communicatively coupled to first and second databases, a computer program within a computer useable medium comprising instructions for determining if the monitoring system is configured to interface with a monitored device among said plurality of monitored devices; instructions for obtaining configuration information from the monitored device if the monitoring system is not configured to interface with the monitored device; instructions for determining if the monitored device is supported by the monitoring system using information stored in the second database; and instructions for updating information stored in the second database if said information is insufficient to support the monitored device, the updating step is performed without reprogramming the monitoring system, thereby allowing flexibility in modifying the monitored devices supported by the monitoring system.

In a further aspect, the present invention provides a network based system having one or more devices communicatively connected to a network, the system comprising a monitoring system connected to the network for monitoring said one or more devices; first and second databases communicatively coupled to the monitoring system, wherein information stored in said second database is updated if said information is insufficient to support the at least one device; and wherein configuration information in said first database is updated with information stored in the second database for enabling the monitoring system to interface with the at least one device, thereby allowing flexibility in modifying the devices supported by the monitoring system.

In yet another aspect, the present invention provides in a network based system, a method of modifying monitored devices supported by a monitoring system, comprising providing first and second databases, said first and second databases communicatively coupled to the monitoring system; updating information stored in the second database if said information is insufficient to support a monitored device, the updating step is performed without reprogramming the monitoring system, thereby allowing flexibility in modifying the monitored devices supported by the monitoring system.

An advantage of the present invention includes the ease with which to change the devices that the system supports by modifying the database rather than the system.

BRIEF DESCRIPTION OF THE DRAWINGS

A more complete appreciation of the present invention and many of the attendant advantages thereof will be readily obtained as the same becomes better understood by reference of the following detailed description when considered in connection with the accompanying drawings.

DETAILED DESCRIPTION OF THE PREFERRED EMBODIMENTS

Figure 1:
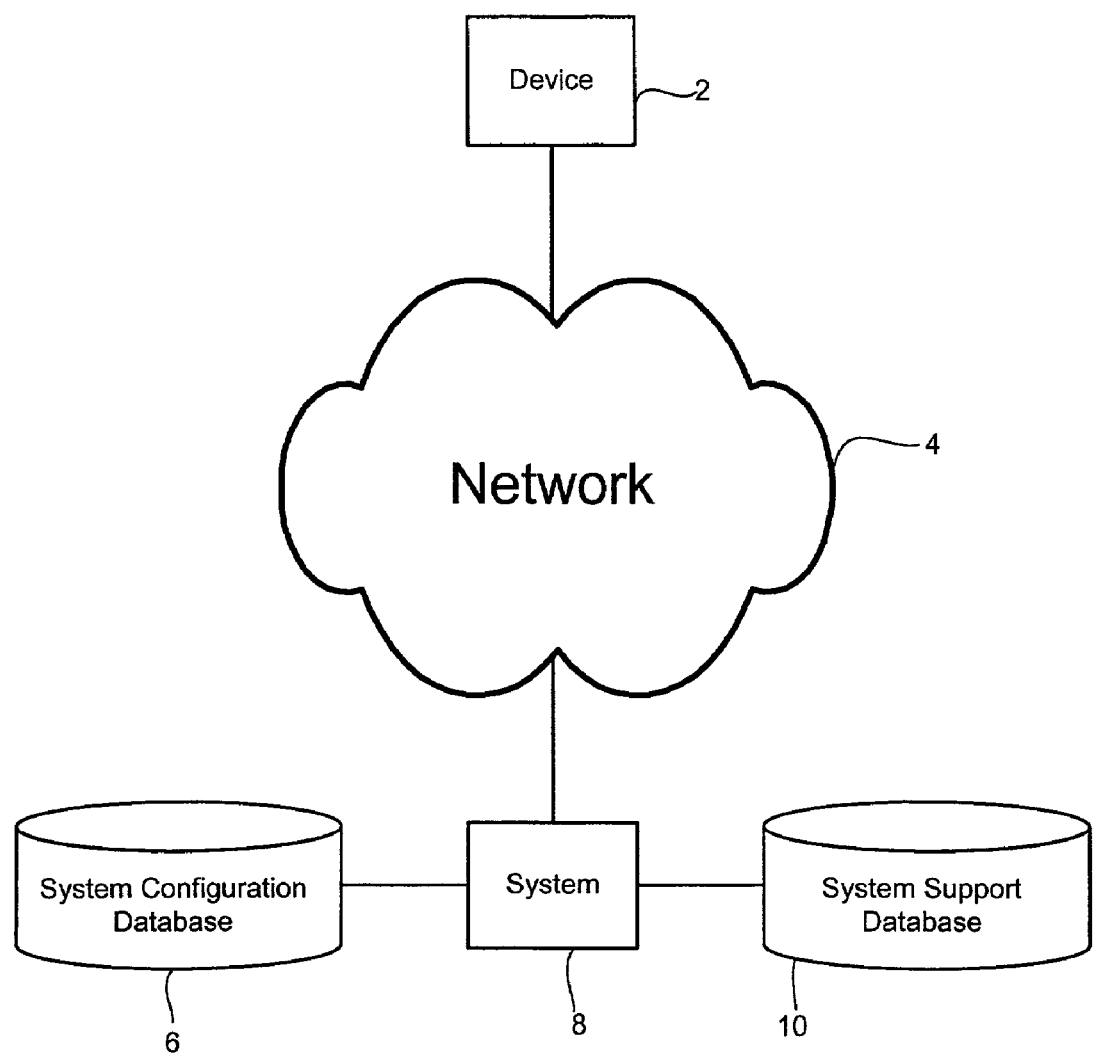
FIG. 1 is a diagram illustrating the network relationship of device 2 and system 8, in an exemplary embodiment of the present invention.

FIG. 1 is a diagram illustrating the network relationship of device 2 and system 8. Device 2 interfaces with system 8 through network 4. System 8 is coupled to System Configuration Database (SCD) 6 and System Support Database (SSD) 10. Network 4 can be any type of communication structure that allows device 2 and system 8 to exchange data. For example, network 4 could be either a Wide Area Network (WAN), Local Area Network (LAN), or a simple cable physically connecting the device 2 and system 8. It will be appreciated that the present invention is not limiting of the type of networks, and that other networks may be used to enable communication between device 2 and system 8.

System Configuration Database 6 includes information of first and second types. The first type of information is configuration or device information, such as, for example, manufacturer name, model name, IP address, company name, contact person's name, and contact person's e-mail address to name a few. The configuration information is used only during the initialization of system 8 in order to determine which devices need to be monitored. The System Configuration Database 6, however, does not include information about what protocol to use to communicate with the device 2. The SCD 6, however, includes information necessary for communication, such as for example, the IP address. Therefore, SCD 6 contains information that is used to determine if system 8 is configured to interface with device 2. The second type of information stored in SCD 6 is status information. Examples of status information include page count, error status, and toner level. Status information is added to the database (SCD 6) after the initialization of the system 8 when the system 8 is monitoring devices connected to the network 4. The System Configuration Database (SCD 6) is not directly dependent on the System Support Database (SSD 10).

The SSD 10 includes information about manufacturers and models that are supported by the system 8. Though this system can support all devices irrespective of manufacturer or model, the amount of status information obtained from the device 2 depends upon manufacturers and models that are supported by the SSD 10. If the manufacturer and model are supported by SSD 10, then detailed status information may be obtained from the device 2. Thus, the SSD 10 determines what type of status information is stored in the System Configuration Database (SCD 6).

Information from both SCD 6 and SSD 10 are used to create device objects to represent the devices being monitored. Although a single device 2 is shown to be connected to the network 4, it will be appreciated that a plurality of devices, that need to be monitored, may be connected to network 4. The device objects allow the system 8 to communicate with the device 2 and determine what information to obtain from the devices.

Figure 2:
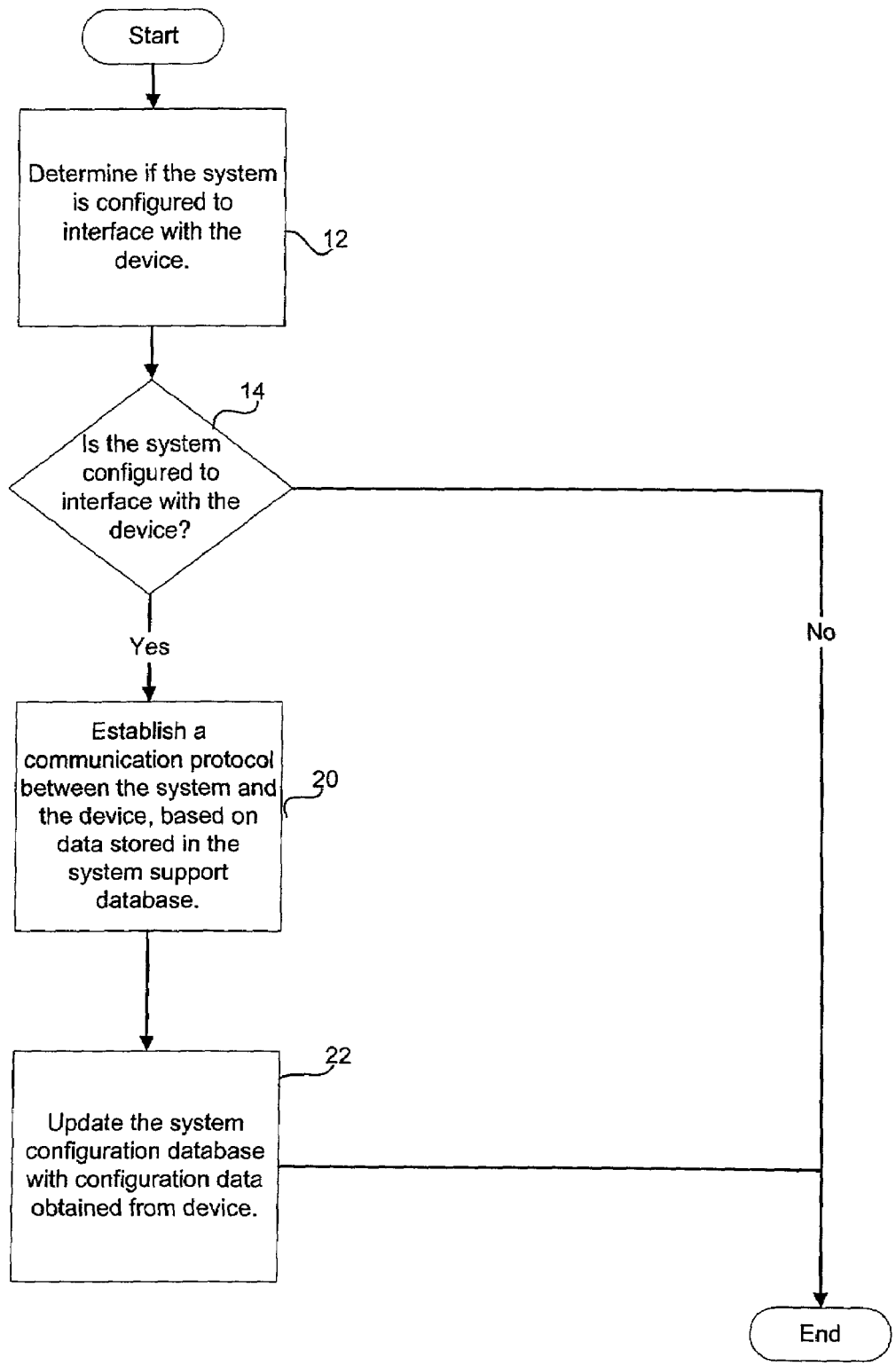
FIG. 2 is an exemplary flowchart illustrating the steps involved to determine if system 8 is configured to interface with device 2.

FIG. 2 is an exemplary flowchart illustrating how it is determined if system 8 is configured to interface with device 2. In block 12, the system 8 or some other device that is part of the network 4 determines if the system 8 is configured to interface with device 2. For example, it is determined whether the system 8 is programmed with software that allows the system 8 to communicate with device 2. In other words, system 8 uses a protocol that is compatible with device 2, such that system 8 and device 2 can exchange data and operate cooperatively. In determining if the system 8 is configured to interface with device 2, the system 8 also obtained configuration information from the device 2 and determines if device 2 is supported by the system 8.

In block 14, if it is determined that system 8 is configured to interface with device 2, then in block 20, a communication protocol is established between system 8 and device 2, based on information stored in System Support Database 10. In block 22, the System Configuration Database (SCD 6) is updated with the configuration data obtained when determining if the system 8 was configured to interface with the device 2. However, if it is determined that the system 8 is not configured to interface with device 2 in block 14, then the process ends and device 2 will not interface with system 8.

Figure 3:
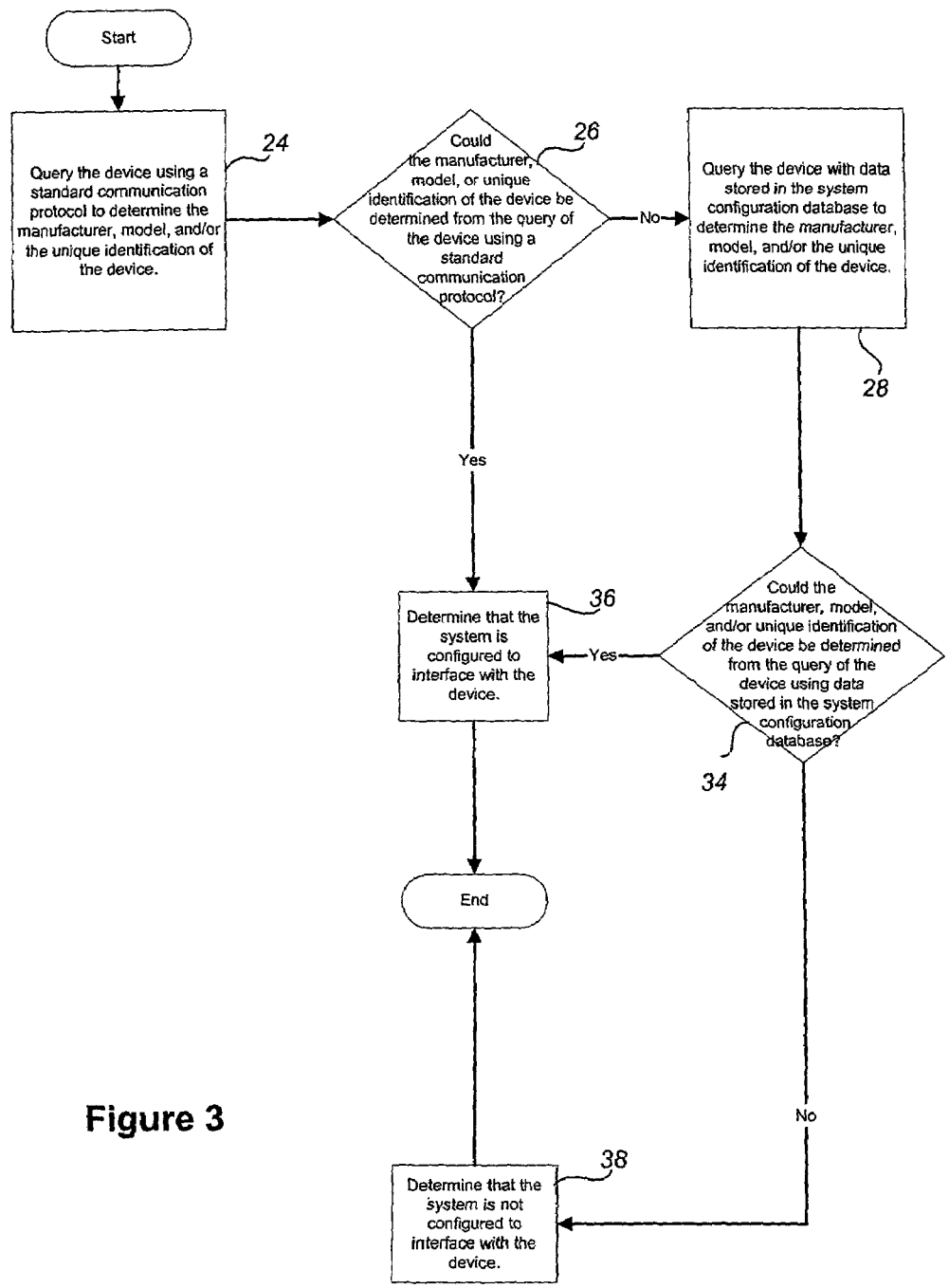
FIG. 3 is an exemplary flow chart illustrating the steps involved to determine if system 8 is configured to interface with device 2 using the System Configuration Database 6.

FIG. 3 is an exemplary flow chart illustrating how it is determined if system 8 is configured to interface with device 2 using the System Configuration Database (SCD 6). In block 24, the device 2 is queried using a standard communication protocol to determine its manufacturer, model, and/or the unique identification.

In block 26, if the manufacturer, model, or unique identification of the device is determined then the process proceeds to block 36, otherwise, the process proceeds to block 28. In block 36, it is determined that the system is configured to interface with the device 2.

In block 28, the device 2 is queried using data stored in the System Configuration Database 6 to determine the manufacturer, model, and/or unique identification of device 2. In block 34, it is determined if the manufacturer, model, and/or unique identification of the device 2 was identified in block 28. If the determination of block 34 is positive, then it is determined in block 36 that the system is configured to interface with the device 2. If the determination of block 34 is negative, then it is determined in block 38 that the system is not configured to interface with device 2.

In querying the device 2 for the manufacturer and model information in blocks 24 and 28, the manufacturer and model of the device is checked with the System Support Database 10 to determine if the manufacturer and model is supported by the system 8. However, it does not affect whether or not the system 8 is configured to interface with the device 2.

The System Support Database 10 is used to determine what status information is to be obtained from the device 2 when it is being monitored by the system 8. A device object for the device 2 includes information from SSD 10 about what status information to obtain. If the manufacturer and model of the device is not supported in the SSD 10, then the device object will obtain status information that is available to all devices connected to the network 4. If the manufacturer is supported in the SSD 10 but the model of the device is not supported, then the device object will obtain status information that is available for all devices of a manufacturer. If the manufacturer and the model are supported, then the device object will obtain status information that is available for all devices of the model.

Figure 4:
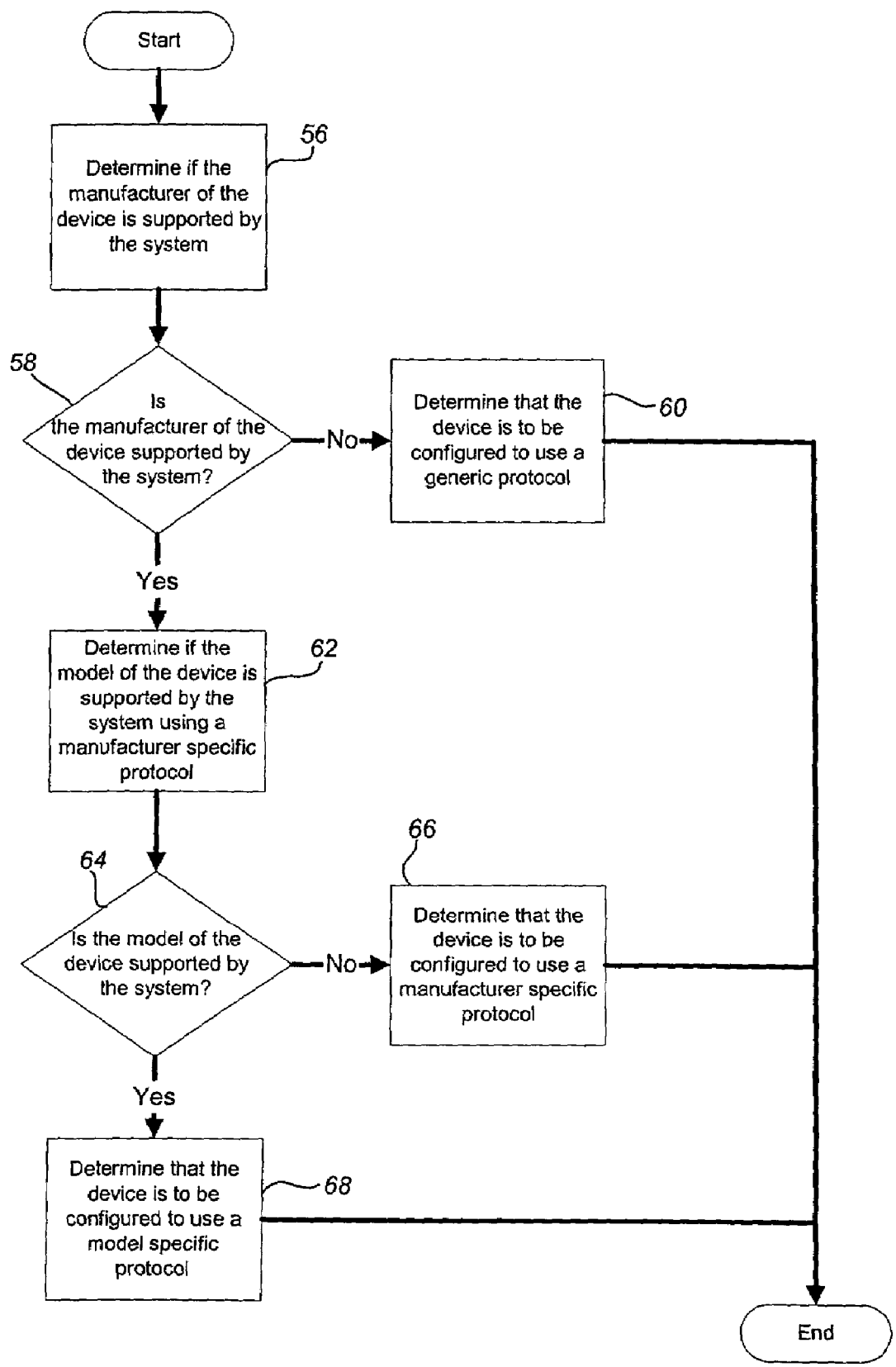
FIG. 4 is an exemplary illustration of a hierarchical approach to determine if device 2 is supported by system 8.

FIG. 4 is an exemplary illustration of a hierarchical approach to determining if device 2 is supported by system 8. In blocks 56 and 58, it is determined if the manufacturer of the device 2 is supported by the system 8. If the manufacturer is not supported, then in block 60 it is determined that the device is to be configured to use a generic protocol. If the manufacturer is supported, then the process proceeds to block 62.

In blocks 62 and 64, it is determined if the model of device 2 is supported by the system 8. If the model is not supported, then it is determined in block 66 that the device 2 is to be configured using a manufacturer specific protocol. If the model is supported, then it is determined in block 68 that the device 2 is to be configured using a model specific protocol.

Figure 5:
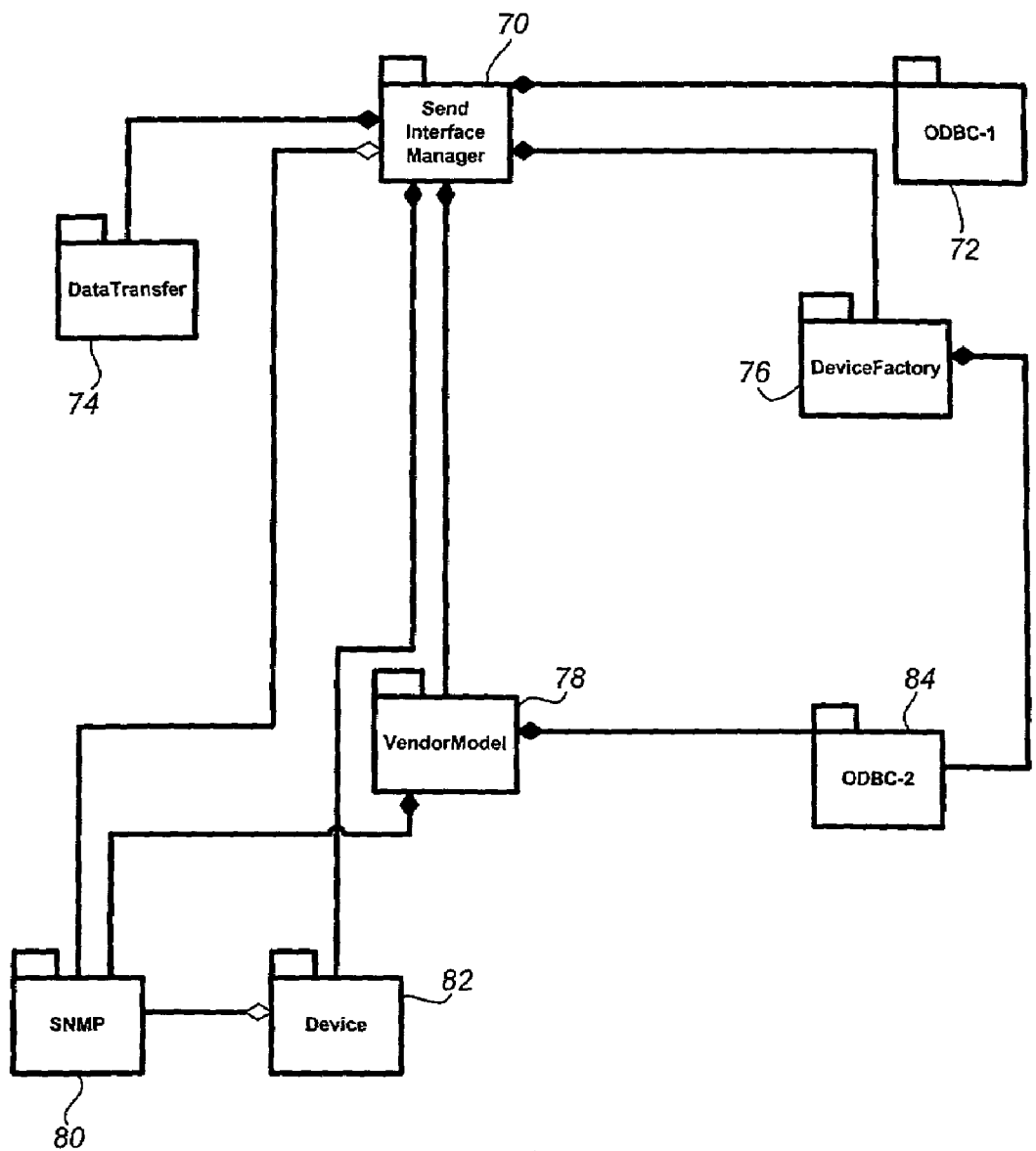
FIG. 5 illustrates software objects in an exemplary embodiment of the present invention.

FIG. 5 illustrates software object in an exemplary embodiment of the present invention. The software object Send Interface Manager 70 interfaces directly or indirectly with software objects DataTransfer 74, ODBC-1 72, DeviceFactory 76, VenderModel 78, ODBC-2 84, SNMP 80, and Device 82.

Table 1 illustrates the functions of the ODBC-1 72.

TABLE 1

| | |
|---|---|
| updateConfig | Before this function is called, the calling function should not replace the manufacturer and model entries if get functions return null string from VendorModel package. This function updates the device information database of the current record in the ODBC. This function is most efficient when the getConfig below is called initially. First, this function checks if IP address is same at the 0DBC. If IP addresses are not the same, the record with correct IP address is obtained from the database. Then, the other fields are copied and the record is updated. |
| getConfig | This function obtains a map from ODBC for the device information in a given format. The function returns true if there is data returned, false if there is no more data. |
| saveStatus | This function saves the status information into the ODBC. The function returns true when saving is successful, false otherwise. |

Table 2 illustrates the functions of DeviceFactory 76.

TABLE 2

| | |
|---|---|
| createDevice | This function creates the device of the specification in the Device Factory. The function returns a pointer to the created device if the creation is successful, 0 otherwise. |

Table 3 illustrates the functions of DataTransfer 74.

TABLE 3

| | |
|---|---|
| startSend | This function triggers the Data Transfer to prepare for sending the data specified in the infoType. The functionreturns the EerrorCode. |
| dataSend | This function in the Data Transfer sends the received data to the appropriate destination after properly formatting, encrypting and encoding. The function returns the EerrorCode.endSend This function in the Data Transfer ends the data sendin The function returns the EerrorCode. |

Table 4 illustrates the functions of Device 82.

TABLE 4

| | |
|---|---|
| getStatus | This function obtains status information from a device. The function returns true when the status is returned, false when status could not be obtained. This function resets the variable that keeps the error status before returning. |
| checkErrorStatus | This function triggers the device to check the error status to be saved internally. |

Table 5 illustrates the functions of ODBC-2 84.

TABLE 5

| | |
|---|---|
| getManufInfo | This function obtains the name of the manufacturer, its vendor OID, the OID where the model information is stored, and the OID where the unique ID can be obtained. This function returns true when the data is returned, false when no more data is available and all the strings are set to null strings. |
| getSupportedModel | This function obtains the Manufacturer and supported model. There may be more than one instances of the same manufacturer, but the model is unique for the given manufacturer. This function returns true when the data is returned, false when no more data is available and all the strings are set to null strings. |
| getManufStatusInfo | This function obtains the infoType and OID associated with the infoType for the given Manufacturer. The obtained infoType and OID pair is supported by all the devices from the given manufacture. This function returns true when the data is returned, false when no more data is available and all the strings are set to null strings. |
| getModelStatusInfo | This function obtains the infoType and OID associated with the infoType for the given Manufacturer and model. This function returns true when the data is returned, false when no more data is available and all the strings are set to null strings. |

Table 6 illustrates the functions of SNMP 80.

TABLE 6

| | |
|---|---|
| setAgent | This function sets the IP address of the device to be contacted. |
| getManufacturer | This function gets the manufacturer at the IP address. If the manufacturer is obtained, the function returns true. If the error is detected in the process, the function returns false. |
| getModel | This function gets the model of the device. If the model is obtained, including the null string, the function returns true. If the error is detected in the process, the function returns false. |
| getUniqueId | This function returns the unique ID from device. If the unique ID is obtained, including the null string, the function returns true. If the error is detected in the process, the function returns false. |

VendorModel 78 is responsible for obtaining information about the manufacturer and model of the monitored device. This software object obtains the manufacturer, model, and unique identifier of the monitored device. The class CVendorModel of VendorModel 78 uses information from the database to determine the manufacturers and models supported by the system. The class also uses information from the database needed to obtain the model and unique identifier from the monitored device. The public and private functions of CVendorModel are shown in Table 7 below.

TABLE 7

| | Function Name | Description |
|---|---|---|
| Public | CVendorModel( ) | Constructor |
| | ~CVendorModel( ) | Destructor |
| | bool setAgent(std::string& in_sIP) | Creates an SNMP session for the monitored device and obtains the manufacturer, model, and unique identifier of the device |
| | bool getManufacturer(std::string& out_sManufacturer) | Returns the manufacturer of the device |
| | bool getModel(std::string& out_sModel) | Returns the model of the device |
| | bool getUniqueID(std::string & out_sID) | Returns the unique identifier of the device |
| Private | void setVectorAndMapAttributes( ) | Constructs a vector containing information needed to determine manufacturer, model, and unique identifier of the device and a map containing information about manufacturers and models supported by the system |
| | void obtainManufacturer( ) | Obtains information about the manufacturer from the device |

TABLE 7-continued

| Function Name | Description |
|---|---|
| void obtainModel( ) | Obtains information about the model from the device |
| void obtainUniqueID( ) | Obtains information about the unique identifier from the device |
| void convertToAllUpper(std::string& inOut_sString) | Converts the input string to all upper case |
| std::string convertToHex(std::string& in_sString) | Converts the input string to a hexadecimal string |

Table 8 below shows the attributes of the CVendorModel class that are used in the above functions.

TABLE 8

| Type | Attribute Name | Description |
|---|---|---|
| CSNMP | m_SNMP | This attribute member is used to implement an SNMP session for the monitored devices. |
| std::vector<ManufacturerAndModelInfo> | m_ManufacturerAndModelInfoVector | This attribute member is a vector that contains information about the object identifiers used to identify the manufacturer, model, and unique identifier of the monitored devices. |
| std::map<std::string, std::vector<std::string>> | m_ManufacturerModelMap | This attribute member is a map that lists all the models of a given manufacturer in the vector that the system supports. |
| std::string | m_sManufacturer | This attribute member represents the Manufacturer of the monitored device. |
| std::string | m_sModel | This attribute member represents the Model of the monitored device. |
| std::string | m_sUniqueID | This attribute member represents the unique identifier of the monitored device. |
| bool | m_bReturn | This attribute is set to true if SNMP session is successful in the setAgent( ) function; false otherwise. |
| std::string | m_sCurrentModelOID | This attribute member represents the object identifier used to find information about the model of the monitored device. |
| std::string | m_sCurrentUniqueOID | This attribute member represents the object identifier used to find information about the unique ID such as a serial number of the monitored device. |

ManufacturerAndModelInfo in m_ManufacturerAndModelInfoVector has the following structure:

```
struct ManufacturerAndModelInfo {
    std::string m_sManufacturer;
    std::string m_sEnterpriseOID;
    std::string m_sModelOID;
    std::string m_sUniqueOID;
};
``` m_sManufacturer is the name of the manufacturer. m_sEnterpriseOID is the enterprise object identifier associated with the manufacturer. The enterprise object identifier is unique to a manufacturer. m_sModelOID is the object identifier that can be used to find the model name of the device. m_sUniqueOID is the object identifier that can be used to find the unique identifier of the device. The unique identifier can be the serial number or the MAC address of the device.

DeviceFactory 76 is responsible for creating a device object representing the monitored device. DeviceFactory 76 makes sure the device object knows what status information it needs to obtain. CDeviceFactory is the only class in DeviceFactory 76 package. The public and private functions of CDeviceFactory are shown in Table 9 below.

TABLE 9

| | Function Name | Description |
|---|---|---|
| Public | CDeviceFactory( ) | Constructor |
| | ~CDeviceFactory( ) | Destructor |
| | virtual CDevice* createDevice(std::string& in_sIP, CSNMP & in_SNMP, std::string & | This function creates a device object representing the monitored device |

TABLE 9-continued

| | Function Name | Description |
|---|---|---|
| | in_sManufacturer, std::string & in_sModel, std::string & in_sUniqueID) | and passes into it a vector containing information about what status information to obtain. |
| Private | void setGenericDeviceVector( ) | This function sets a vector to contain information used to obtain status information that is obtainable from all monitored devices. |
| | void setManufacturerVectorMap( ) | This function sets a map to contain information used to obtain status information that is obtainable from all monitored devices of the specific manufacturers. |

Table 10 below shows the attributes of the CDeviceFactory class that are used in the above functions.

TABLE 10

| Type | Attribute Name | Description |
|---|---|---|
| CSupportODBC | m_SupportODBC | This attribute member represents an object used to access information in the database that is needed to obtain status information of the monitored devices. |
| std::vector<std::pair<info Type, std::string>> | m_GenericDeviceVector | This attribute member contains information used to obtain status information for monitored devices of all manufacturer and model. |
| std::map<std::string, std::vector<std::pair<info Type, std::string>> > | m_ManufacturerVectorMap | This attribute member contains information used to obtain status information for monitored devices of a given manufacturer. | infoType is a number used in m_GenericDeviceVector and m_ManufacturerVectorMap used to represent a specific type of status information. For example, 503 represents a NoPaper condition for the monitored device and 601 represents the page life count of the monitored device.

Device 82 represents a monitored device. It accesses status information of the monitored device. Status information includes information such as error status, page count, toner cartridge level, and alerts. CDevice is the only class in Device 82 package. The public functions of CDevice are shown in Table 11 below.

TABLE 11

| | Function Name | Description |
|---|---|---|
| Public | CDevice (std::string& in_sIPaddress, CSNMP& in_SNMP, std::string& in_sManufacturer, std::string& in_sModel, std::string& in_sUniqueID) | Constructor |
| | ~CDevice ( ) | Destructor |
| | bool getStatus(std::map<infoType, std::string> & out_StatusInformation) | This function obtains the status information of the monitored device |
| | bool checkErrorStatus( ) | This function gets the error status of the monitored device |
| | bool setNumOID Vector (std::vector<std::pair<infoType, std::string>> & in_Vector) | This function sets the vector that will be used to obtain the status information from the monitored device via SNMP. |

Table 12 below shows the attributes of the CDevice class that are used in the above functions.

TABLE 12

| Type | Attribute Name | Description |
| --- | --- | --- |
| std::string | m_sIPAddress | This attribute member is the IP address of the monitored device |
| CSNMP & | m_SNMP | This attribute member is used to implement an SNMP session for the monitored devices. |
| std::string | m_sManufacturer | This attribute member is the manufacturer of the monitored device. |
| std::string | m_sModel | This attribute member is the model of the monitored device. |
| std::string | m_sUniqueID | This attribute member is the unique ID) for the monitored device. |
| char | m_cError | This attribute member is to keep the error bits representing the error status of the monitored device |
| std::vector<std::pair<infoType, std::string>> | m_NumOIDVector | This vector stores information that will be used to obtain the status information from the monitored device via SNMP. |

Figure 6:
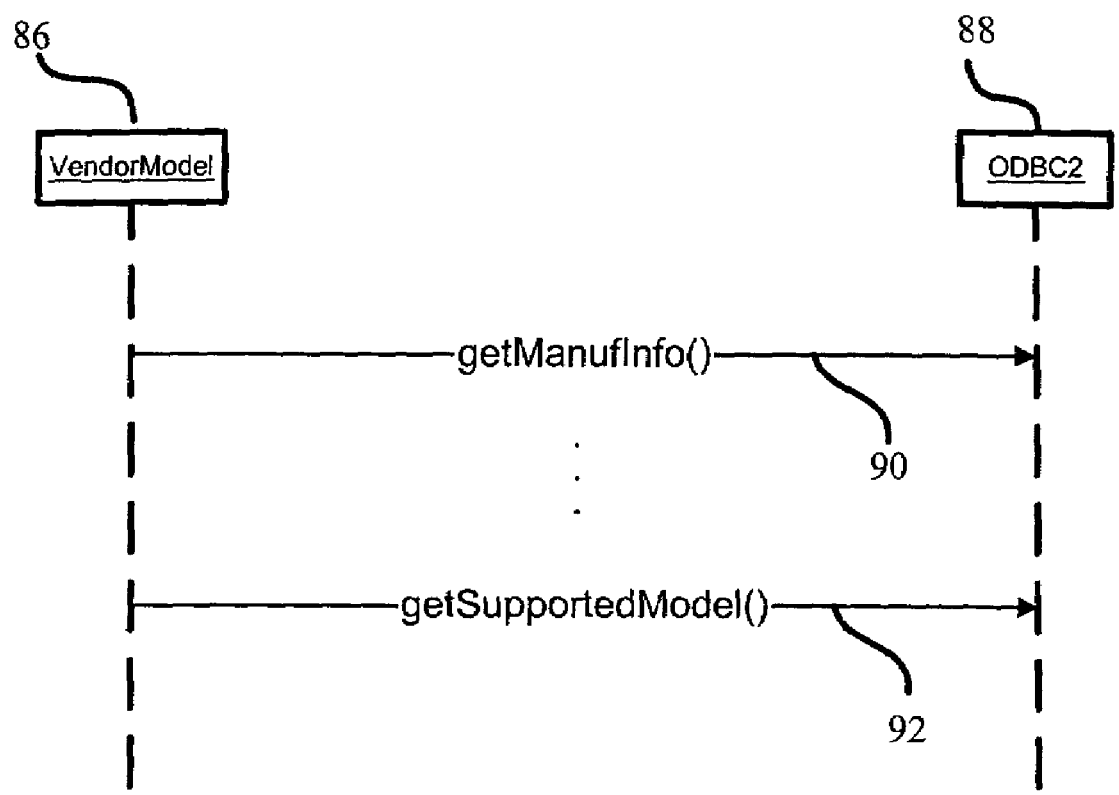
FIG. 6 illustrates an exemplary sequence diagram when the system is initialized to obtain information about object identifiers used to identify the manufacturer, model, and unique identifier, and to obtain information about the manufacturers and models supported by the system.

FIG. 6 illustrates an exemplary sequence diagram when the system is initialized to obtain information about the object identifiers used to identify the manufacturer, model, and unique identifier and to obtain information about the manufacturers and models supported by the system. VendorModel 86 interacts with ODBC2 88 to obtain this information. ODBC2 88 provides an interface to the database to obtain information requested of it by VendorModel 86. VendorModel 86 calls the function getManufInfo( ) 90 of ODBC2 88 to obtain the object identifiers used to identify the manufacturer, model, and unique identifier of the monitored devices from the database. This information is stored in the vector m_ManufacturerAndModelInfoVector described in Table 8 above. getManufInfo( ) 90 is called multiple times until all the object identifiers for all manufacturers supported by the system are read in from the database. Then VendorModel 86 calls the function getSupportedModel( ) 92 of ODBC2 88 to obtain the manufacturer and model supported by the system from the database. This information is stored in the map m_ManufacturerModelMap described in Table 8 above. getSupportedModel( ) is called multiple times until all the models supported by the system are read in from the database. To remove, modify, or add the manufacturers and models supported by the system, the only change necessary is in the database which stores information about the supported manufacturers and models. No change needs to be done to the system when the manufacturers and models supported by the system changes. The information is read in from the database during initialization.

Figure 7:
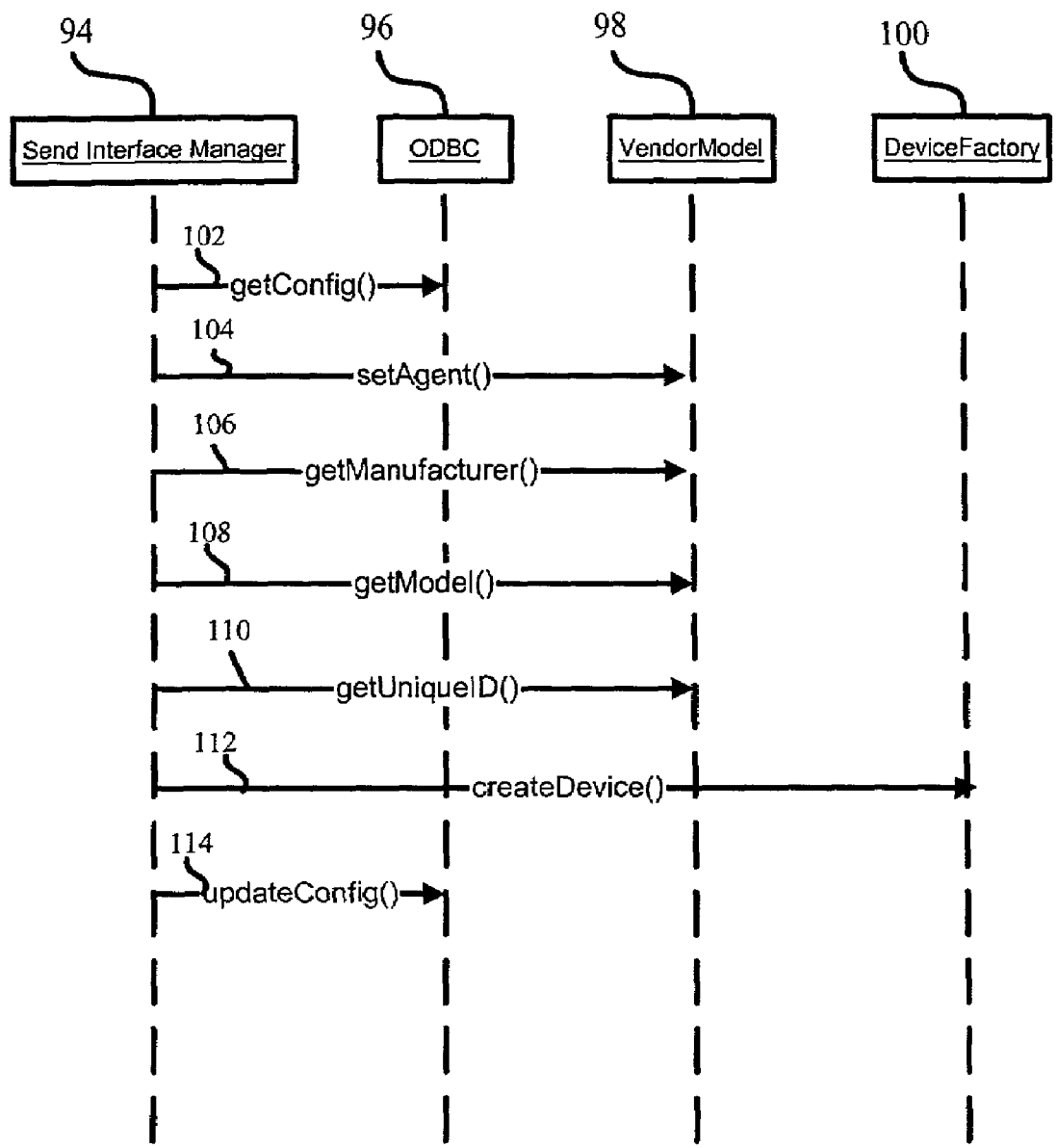
FIG. 7 illustrates an exemplary sequence diagram for creating device objects to represent the monitored devices during initialization.

FIG. 7 illustrates an exemplary sequence diagram for creating device objects to represent the monitored devices during initialization. Initially, the system 8 (FIG. 1) attempts to establish communication with device 2. If the system 8 cannot be configured to interface with device 2, configuration information, such as manufacturer, model, and a unique identifier from device 2 is obtained. In the process of determining the configuration information, a determination is made to find out if the device 2 is supported by the system 8 using information from System Support Database (SSD 10). A device object is created using information from the SSD 10, thus establishing a communication protocol between the system 8 and the device 2—irrespective of whether or not the device is supported by the system 8. Subsequently, configuration information for the device 2 is updated in the System Configuration Database (SCD 6). SendInterfaceManager 94 calls getConfig( ) 102 of ODBC 96. ODBC 96 provides an interface to the database to obtain configuration information of the monitored devices. The configuration information includes manufacturer name, model name, and IP address of the monitored device, the name, phone number, and email address of the contact person who is responsible for the monitored device. The database contains the configuration information of all devices that are to be monitored. However, not all of the devices in this database may be supported by the system as specified in the database associated with ODBC2 84 of FIG. 5.

SendInterfaceManager 94 calls setAgent( ) 104, creating an SNMP session with the monitored device to obtain the manufacturer, model, and unique identifier of the device. More details of this function are provided in FIG. 8. SendInterfaceManager 94 calls getManufacturer( ) 106, getModel( ) 108, and getUniqueID( ) 110 of VendorModel 98 to get the manufacturer name, model name, and unique identifier of the monitored device. SendInterfaceManager 94 calls createDevice( ) 112 of DeviceFactory 100 to create a device object for the monitored device. The device object will be used by SendInterfaceManager 94 to obtain status information of the monitored device. SendInterfaceManager 94 calls updateConfig( ) of ODBC 96 to update the configuration information in the database.

All the steps in the sequence are repeated until all the monitored devices in the database are obtained. A device object will be created for each of the monitored devices. SendInterfaceManager 94 will maintain each of the device objects.

Figure 8:
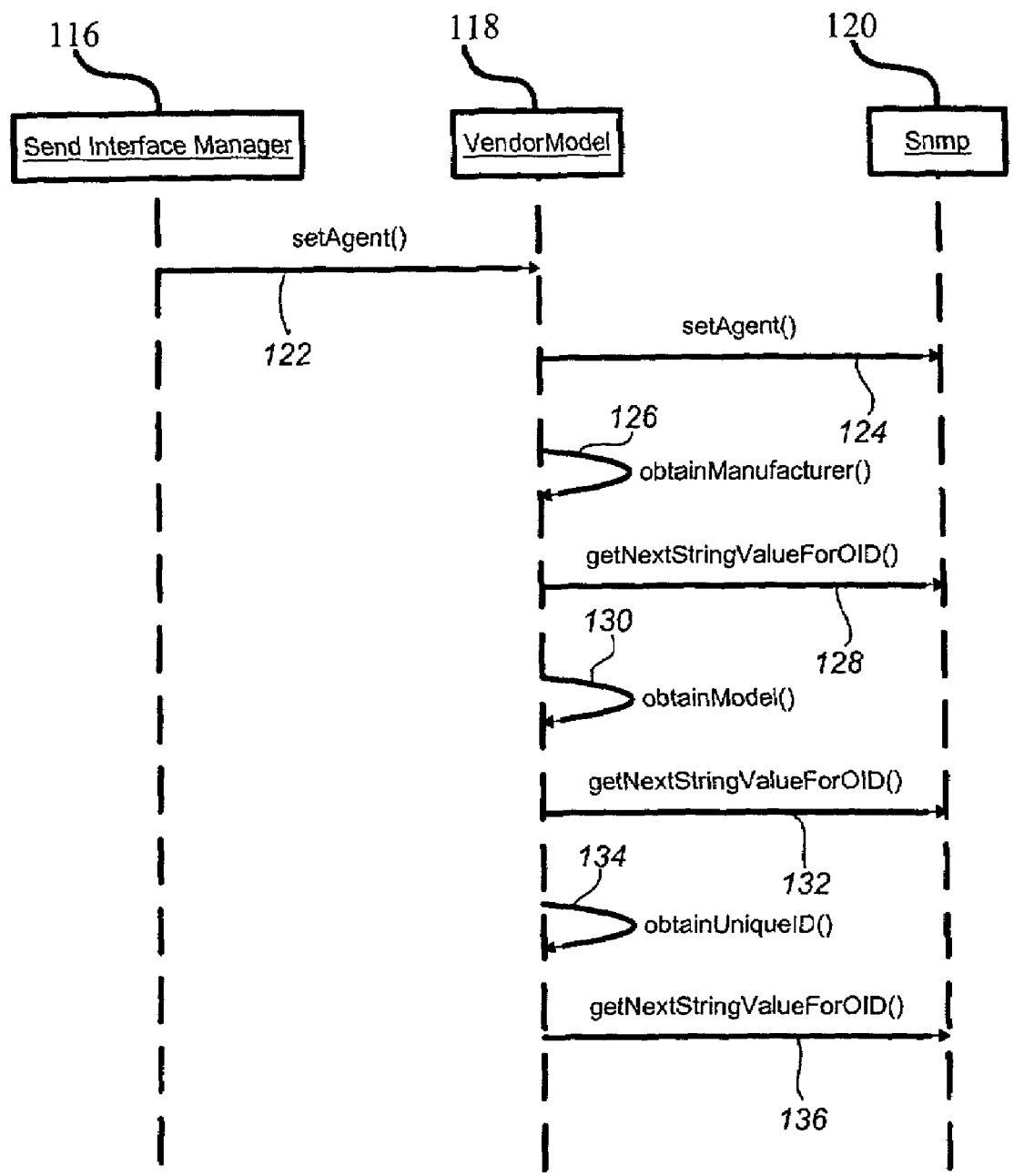
FIG. 8 shows the sequence diagram for executing the setAgent( ) 122 function of VendorModel 118.

FIG. 8 shows the sequence diagram for executing the setAgent( ) 122 function of VendorModel 118. SendInterfaceManager 116 calls setAgent( ) 122 of VendorModel 118. VendorModel 118 calls setAgent( ) 124 of SNMP 120. This function sets up an SNMP session between the system and the monitored device. VendorModel 118 calls its own function obtainManufacturer( ) 126 to obtain the manufacturer name of the monitored device. In the function obtainManufacturer( ) 126, VendorModel 118 calls getNextStringValueForOID( ) 128 of SNMP 120 to obtain the enterprise object identifier via SNMP from the monitored device. The enterprise object identifier is used to identify the manufacturer of the monitored device. VendorModel 118 calls its own function obtainModel( ) 130 to obtain the model name of the monitored device. In the function obtainModel( ) 130, VendorModel 118 calls getNextStringValueForOID( ) 132 of SNMP 120 to obtain the model name of the monitored device via SNMP. VendorModel 118 calls its own function obtainUniqueID( ) 134 to obtain the unique identifier of the monitored device. In the function obtainUniqueID( ) 134, VendorModel 118 calls getNextStringValueForOID( ) 136 of SNMP 120 to obtain the unique identifier of the monitored device via SNMP.

Figure 9:
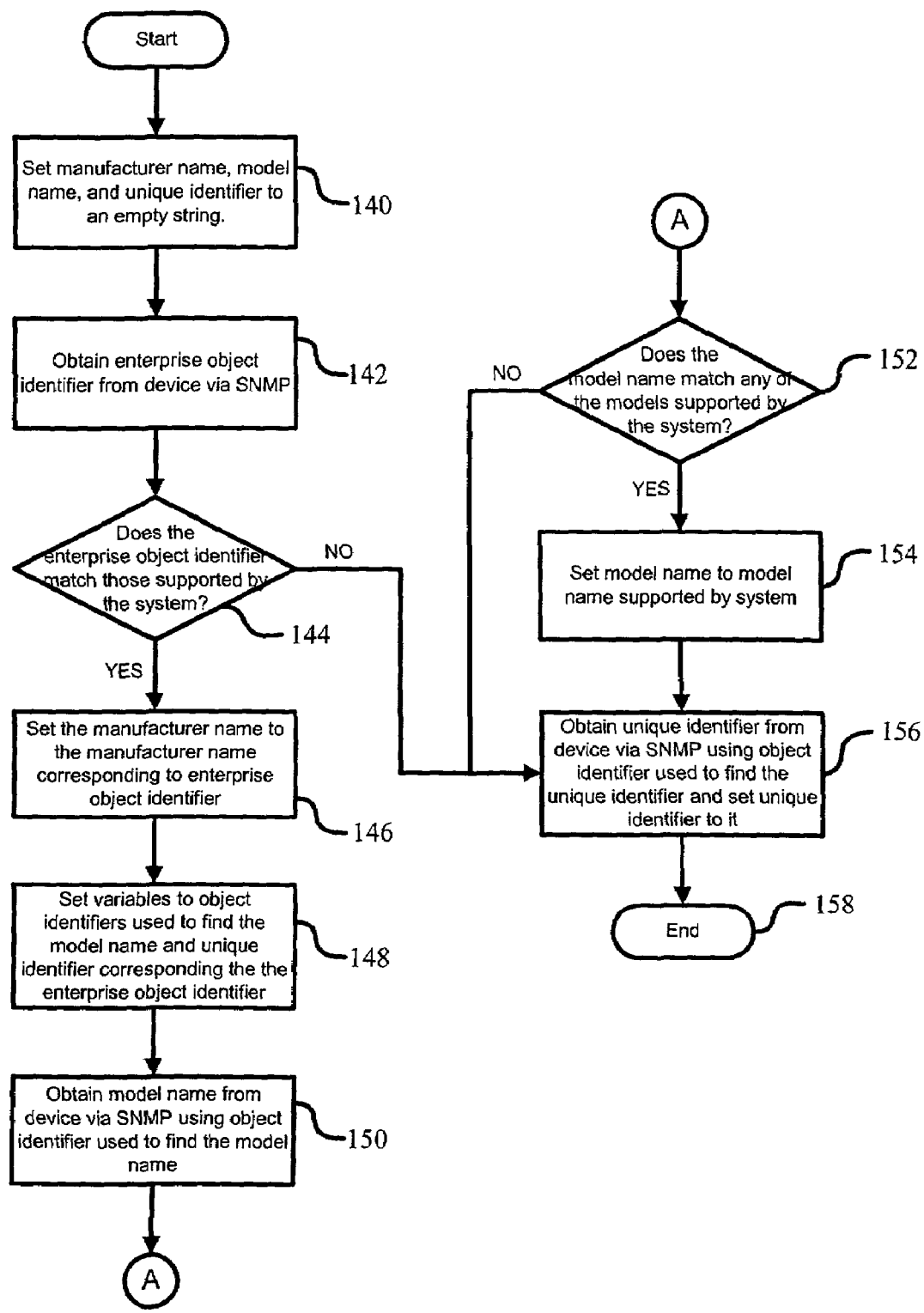
FIG. 9 is an exemplary flowchart for the setAgent( ) function of VendorModel.

FIG. 9 is an exemplary flowchart for the setAgent( ) function of VendorModel. In step 140 the variables representing the manufacturer name, model name, and unique identifier are set to an empty string. These variables are m_sManufacturer, m_sModel, and m_sUniqueID as exemplified in Table 8. In step 142 the enterprise object identifier of the monitored device is obtained via SNMP. In step 144 the enterprise object identifier obtained from the monitored device is compared to those supported by the system. The enterprise object identifier and its corresponding manufacturer supported by the system are stored in the vector m_ManufacturerAndModelInfoVector as described in Table 8. The vector is searched to determine if the enterprise object identifier of the monitored device is found. If the enterprise object identifier cannot be found in the vector, then step 156 will be processed next. If the enterprise object identifier is found in the vector, then the manufacturer of the monitored device is supported by the system and step 146 is processed next. In step 146 the variable for the manufacturer name m_sManufacturer is set to the manufacturer name corresponding to the enterprise object identifier in the vector. In step 148 the variables m_sCurrentModelOID and m_sCurrentUniqueOID for the object identifier used to find the model name and the unique identifier of the monitored device is set to the object identifiers corresponding to the enterprise object identifier in the vector. In step 150 the model name is obtained from the monitored device via SNMP using the object identifier m_sCurrentModelOID.

In step 152 the model name obtained from the monitored device is compared to those supported by the system. The manufacturer and model supported by the system are stored in the map $m_{13}$ ManufacturerModelMap as described in Table 8. The map is searched to determine if the model is found in the map. If the model cannot be found in the map, then step 156 will be processed next. If the model can be found in the map, then the model of the monitored device is supported by the system and step 154 is processed next. In step 154 the variable for the model name m_sModel is set to the model name obtained from the monitored device. In step 156 the unique identifier is obtained from the monitored device via SNMP using the object identifier m_sCurrentUniqueOID. Then set the variable for the unique identifier m_sUniqueID to the unique identifier obtained from the monitored device.

The functions setAgent( ) of VendorModel allows the system to obtain the manufacturer name and model name of the monitored device via SNMP to determine if it is supported by the system. Also, it allows the system to verify the manufacturer name and model name.

Figure 10:
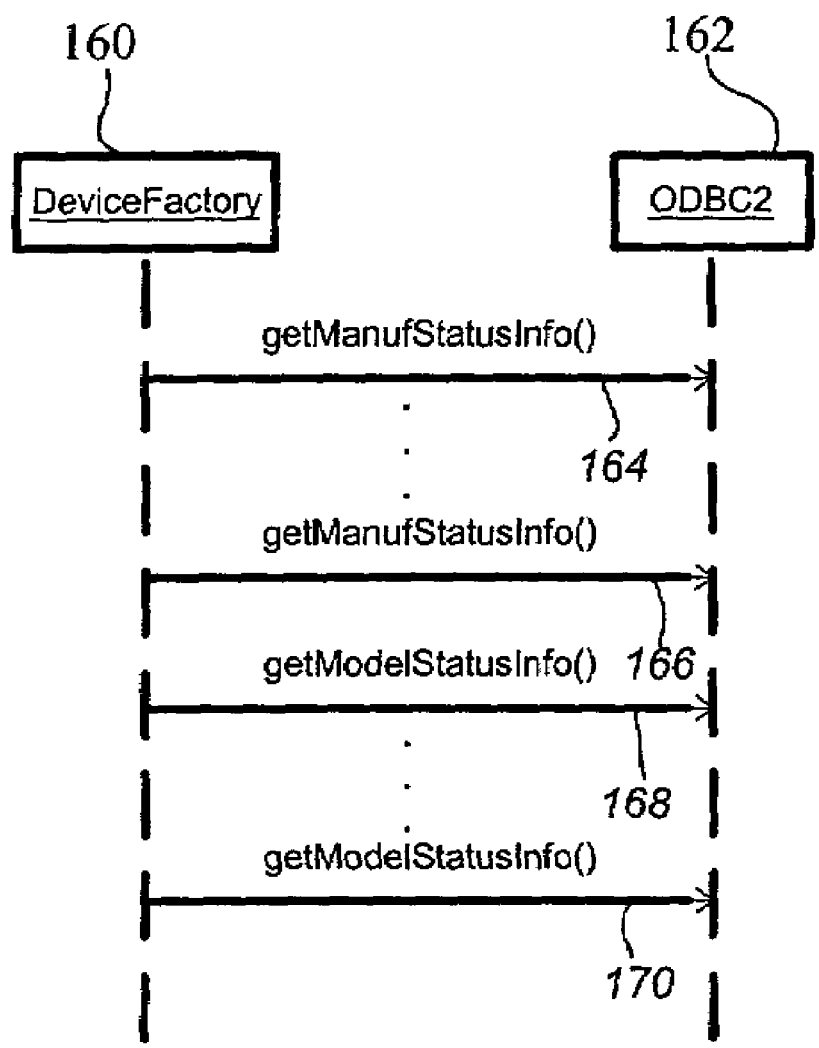
FIG. 10 exemplifies a sequence diagram when the system obtains information used to obtain the status information for the specific manufacturer and model of the monitored devices.

FIG. 10 exemplifies a sequence diagram when the system obtains information used to obtain the status information for the specific manufacturer and model of the monitored devices. DeviceFactory 160 interacts with ODBC2 162 to obtain this information. ODBC2 162 provides an interface to the database to obtain information requested of it by DeviceFactory 160. DeviceFactory 160 calls the function getManufStatusInfo( ) 164 of ODBC2 162 to obtain information needed to obtain the status information from monitored devices for a specific manufacturer via SNMP. The information includes a number (infoType) representing some type of status information and an object identifier used to obtain the status information via SNMP. getManufStatusInfo( ) 166 is called multiple times until the information needed to obtain all the status information for a specific manufacturer are read in from the database. Then DeviceFactory 160 calls the function getModelStatusInfo( ) 168 of ODBC2 162 to obtain information needed to obtain status information from monitored devices for a specific model via SNMP. The information includes a number (infoType) representing some type of status information and an object identifier used to obtain the status information via SNMP. getModelStatusInfo( ) 170 is called multiple times until the information needed to obtain all the status information for a specific model are read in from the database. This sequence is called within the createDevice( ) function of DeviceFactory when a device object is created for the monitored device. This information will be added to the device object as described in FIG. 11.

By using the database to store information used to obtain the status information pertaining to the manufacturer and the status information pertaining to the model, status information to be obtained from the monitored devices can be easily modify, remove, or add to the database without any changes to the system.

Figure 11:
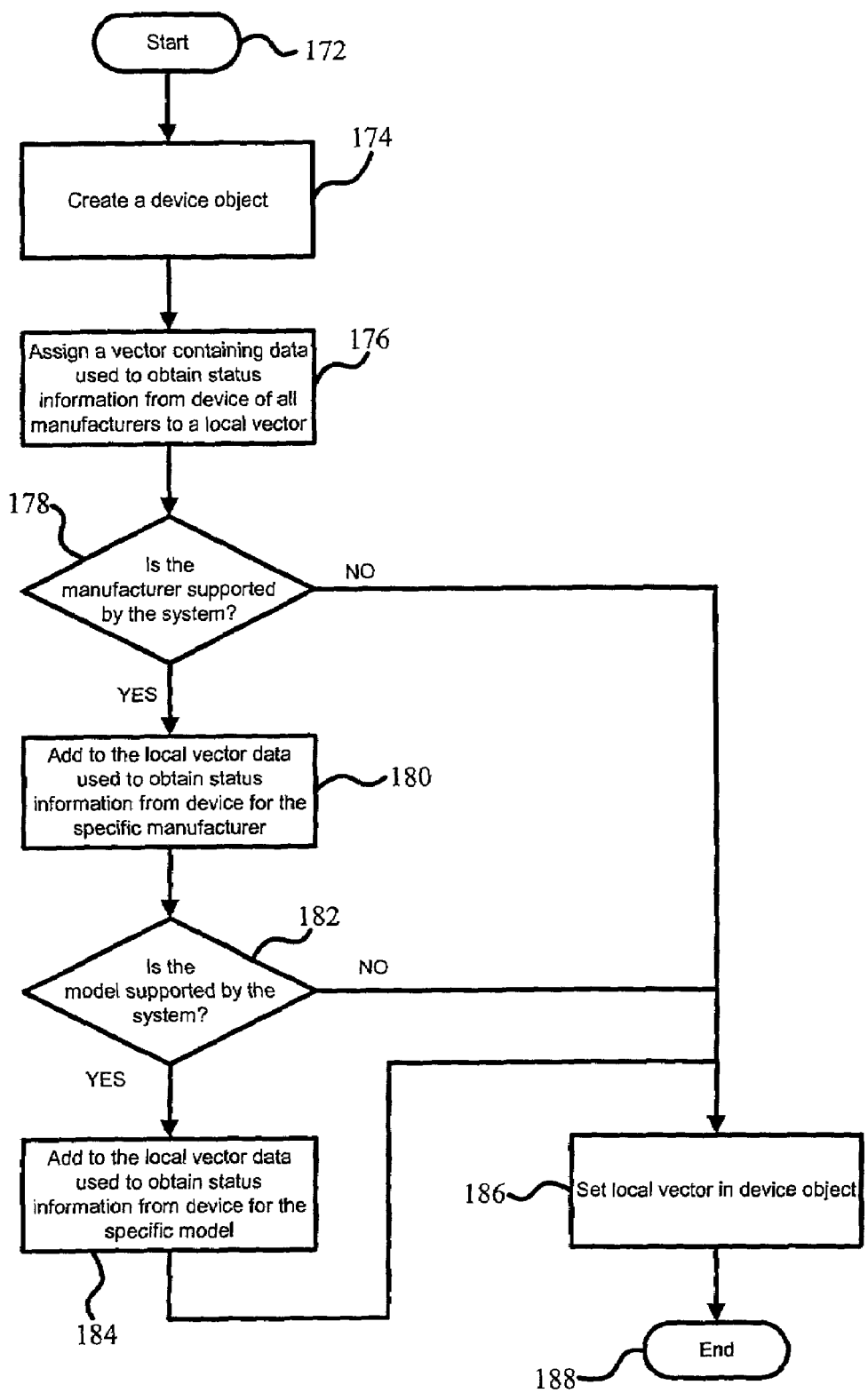
FIG. 11 shows the flowchart for the createDevice( ) function of DeviceFactory.

FIG. 11 shows the flowchart for the createDevice( ) function of DeviceFactory. In step 174 a device object is created to represent the monitored devices. In step 176 a vector containing information needed to obtain status information from devices of all manufacturers is assigned to a local vector. This vector corresponds to m_GenericDeviceVector described in Table 10. In step 178 the manufacturer name of the monitored device is checked to see if it is supported by the system (the manufacturer name is an empty string if it is not supported by the system). If the manufacturer name is not supported, then step 186 will be processed next. If the manufacturer name is supported, then step 180 will be processed next.

In step 180 information needed to obtain status information from the monitored device of a specific manufacturer is obtained from a map and added to the local vector. The map corresponds to m_ManufacturerVectorMap described in Table 10. In step 182 the model name of the monitored device is checked to see if it is supported by the system (the model name is an empty string if it is not supported by the system). If the model name is not supported, then step 186 will be processed next. If the model name is supported, then step 184 will be processed next.

In step 184 information needed to obtain status information from the monitored device of a specific model is obtained from the database and added to the local vector. In step 186 the local vector containing the information needed to obtain all the status information of the monitored device is set in the device object. The device object will have information about what status information it must get from the monitored device.

DeviceFactory creates and initializes all the device objects so that it knows what status information it must obtain.

Figure 12:
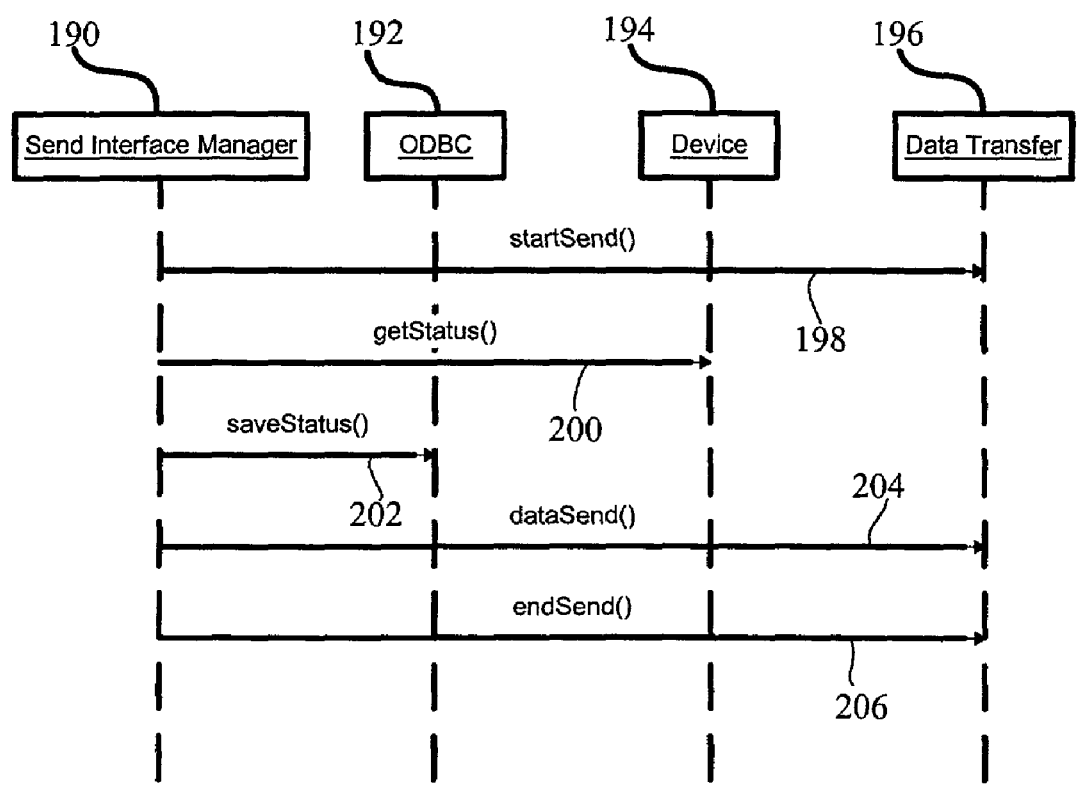
FIG. 12 shows the sequence diagram for executing the monitorStatus( ) function.

FIG. 12 shows the sequence diagram for executing the monitorStatus( ) function. The process sends the status information of the monitored devices to a desired location. SendInterfaceManager 190 calls startSend( ) 198 of DataTransfer 196 to prepare the system to send the status information of the monitored devices via email (SMTP). SendInterfaceManager 190 calls getStatus( ) 200 of Device 194 to obtain the status information of the monitored device. Device 194 corresponds to the monitored device and it knows what status information it must obtain. SendInterfaceManager 190 calls saveStatus( ) 202 of ODBC 192 to store the status information of the monitored device in the database. SendInterfaceManager 190 calls dataSend( ) 204 of DataTransfer 196 to send the status information of the monitored device via email (SMTP). The steps of calling getStatus( ) 200, saveStatus( ) 202, and dataSend( ) 204 are repeated for each monitored device. There is a device object for each monitored device. SendInterfaceManager 190 calls endSend( ) 206 of DataTransfer 196 to complete the sending of the status information via email.

Figure 13:
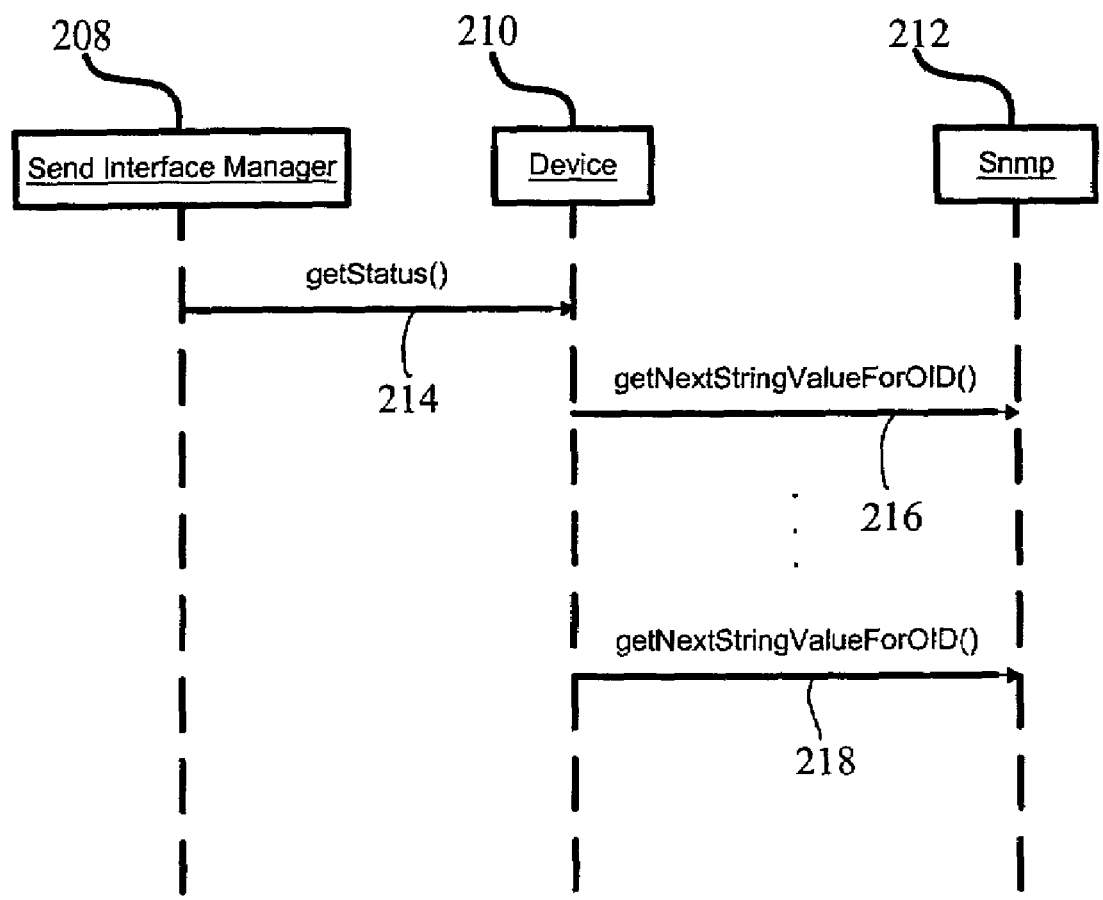
FIG. 13 shows the sequence diagram for executing the getStatus( ) 214 function of Device 210.

FIG. 13 shows the sequence diagram for executing the getStatus( ) 214 function of Device 210. SendInterfaceManager 208 calls getStatus( ) 214 of Device 210 to obtain the status information of the monitored device. Device 210 represents a monitored device of a specific manufacturer and model. The status information will be obtained from the monitored devices via SNMP. If the monitored device is not supported by the system, then the status information obtained from the monitored device is the status information obtainable for all monitored devices (all-system status information) such as error status. If the manufacturer but not the model of the monitored device is supported by the system, then the status information obtained from the monitored device is the all-system status information and the status information obtainable for all monitored devices of the specific manufacturer (manufacturer-specific status information). If the manufacturer and model of the monitored device is supported by the system, then the status information obtained from the monitored device is the all-system status information, the manufacturer-specific status information, and the status information obtainable for all monitored devices of the specific model (model-specific status information). Device 210 contains a vector so that it knows which information it needs to obtain. Device 210 calls getNextStringValueForOID( ) of Snmp 212 so the system can obtain the status information from the monitored device via SNMP. getNextStringValueForOID( ) 218 is called multiple times to obtain all the status information from the monitored device.

Figure 14:
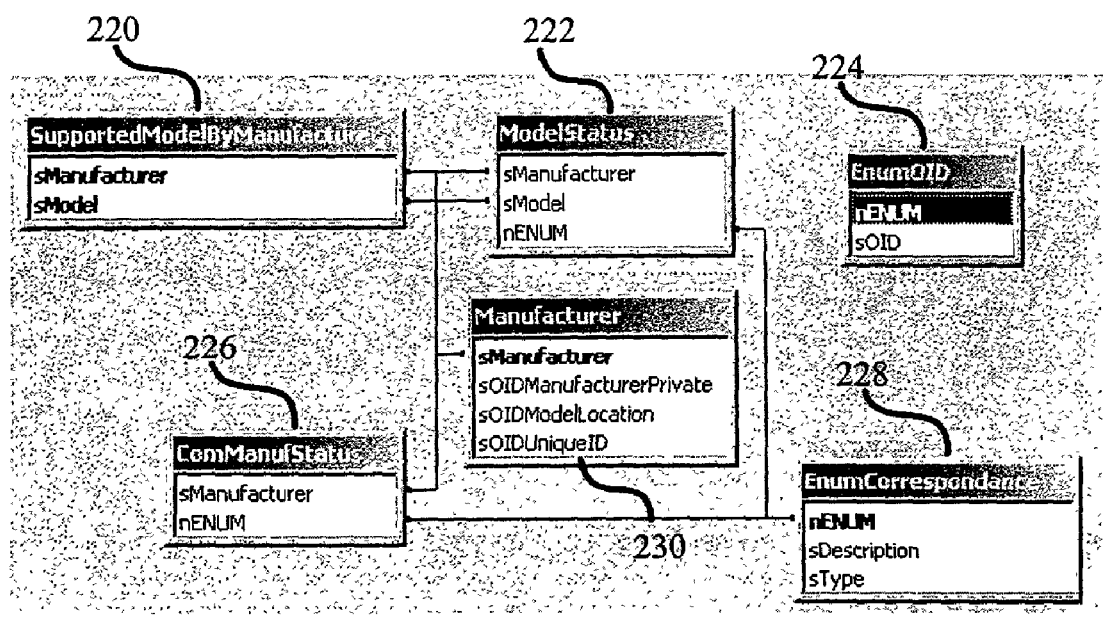
FIG. 14 shows the tables of a database having information about the manufacturers and models supported by the system.

FIG. 14 shows the tables of a database that contains information about the manufacturers and models supported by the system. The table also includes information about what information is to be obtained for each manufacturer and model. Manufacturer 230 is the table that contains information about the manufacturers supported by the system. Manufacturer 230 also contains the following information-enterprise object identifier for the manufacturer, object identifier used to find the model name of the monitored device, and object identifier used to find the unique identifier of the monitored device. SupportedModelByManufacturer 220 is the table that contains the models with its corresponding manufacturer that are supported by the system. To add or remove manufacturers and models supported by the system, only the tables Manufacturer 230 and SupportedModelByManufacturer 220 need to be modified. No modification needs to be made to the code of the system. The system will read the information from these tables of the database.

ComManufStatus 226 is the table that contains information about what information will be obtained from the monitored device based on its manufacturer name. The table contains the manufacturer name and a number representing the type of information. ModelStatus 222 is the table that contains information about what information will be obtained from the monitored device based on its model name. The table contains the manufacturer name, the model name, and a number representing the type of information. To add or remove information to obtained from the monitored device, only the tables ComManufStatus 226 and ModelStatus 222 need to be modified. No modification needs to be made to the code of the system. The system will read the information from these tables of the database.

EnumOID 224 is the table that contains information about the object identifier used to find the information corresponding to the number. The object identifier will be used by the system to find a specific type of information from the monitored device via SNMP. EnumCorrespondence 228 is the table that contains a description of the numbers used to represent a type of information. This table is not used by the system but will provide the user of the system information about what the numbers represent.

Figure 15:
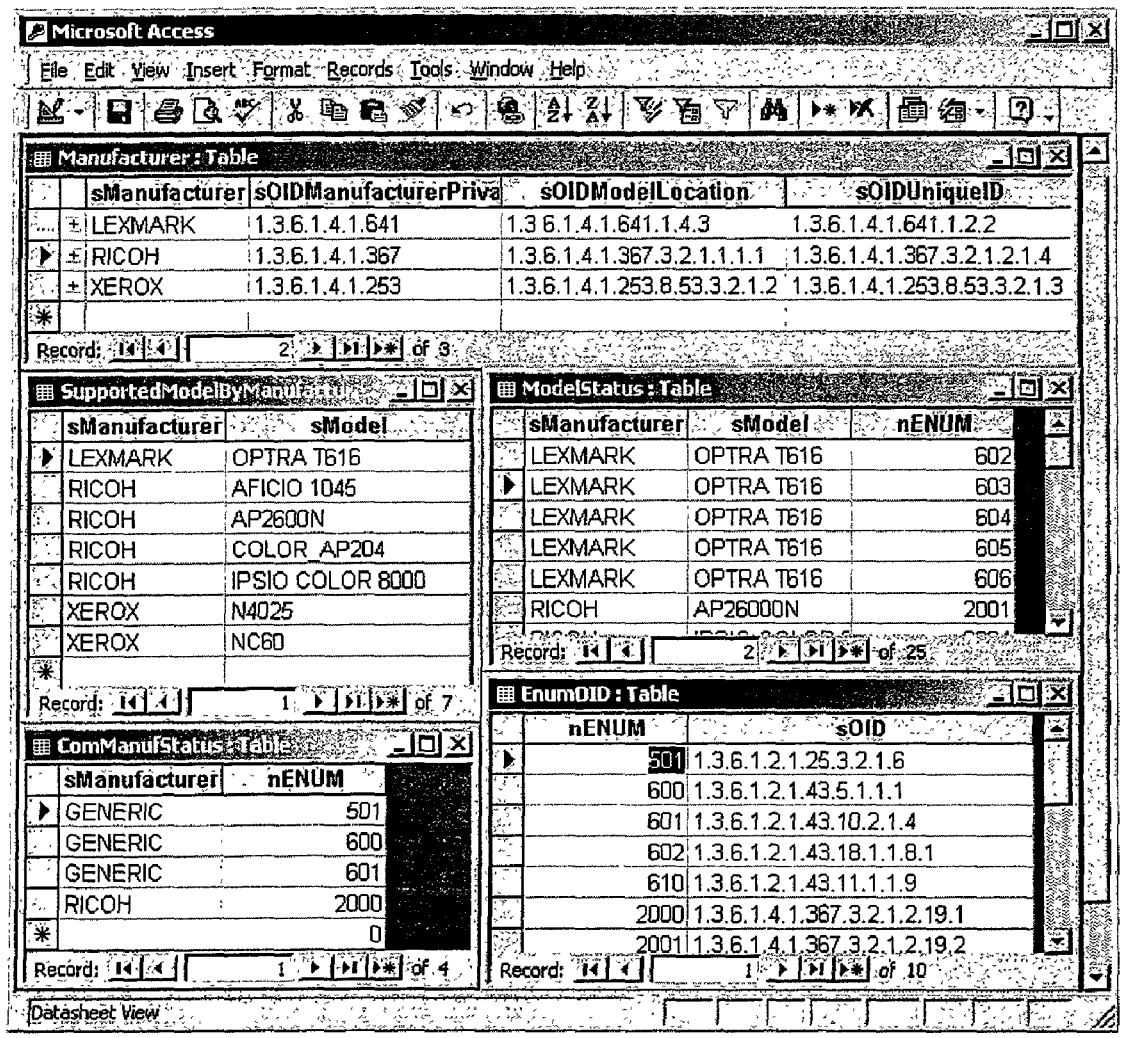
FIG. 15 shows an example of the contents in the tables of the database as described in FIG. 14.

FIG. 15 shows an example of the contents in the tables of the database as described in FIG. 14. Microsoft Access is the database used to store information about the manufacturers and models supported by the system.

Figure 16:
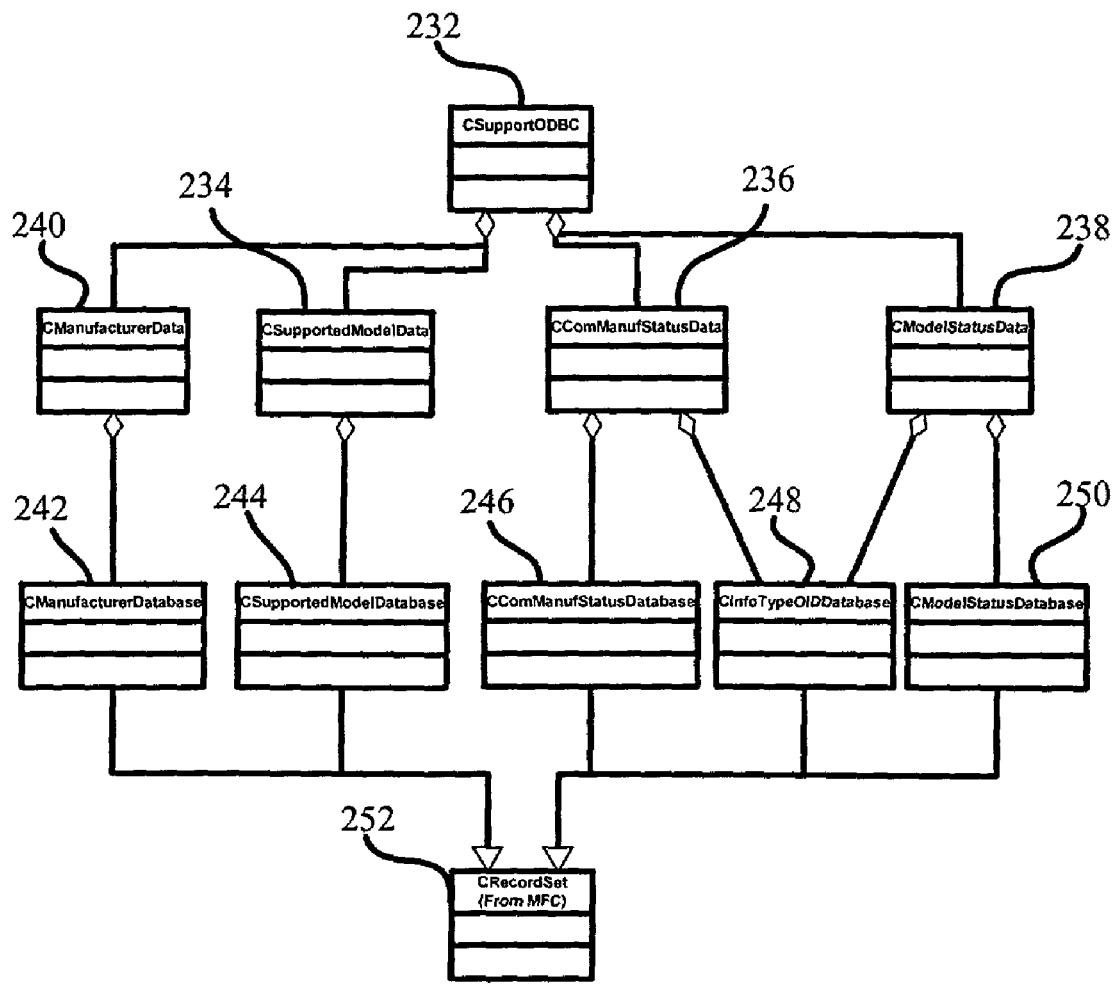
FIG. 16 shows the class diagram for the ODBC2 package.

FIG. 16 shows the class diagram for the ODBC2 package. The CSupportODBC 232 class is the interface for this package to access information in the database. The CManufacturerData 240 class accesses information from the database needed to obtain the manufacturer, model, and unique ID of the monitored device. The CSupportedModelData 234 class accesses information from the database about the manufacturer and model of monitored device supported by the system. The CComManufStatusData 236 class accesses information from the database needed to obtain manufacturer status information associated with the monitored device. The CModelStatusData 238 class accesses information from the database needed to obtain model status information associated with the monitored device. The CManufacturerDatabase 242 class provides an interface to the table in the database that contains the manufacturer information. The CSupportedModelDatabase 244 class provides an interface to the table in the database that contains information about supported models. The CComManufStatusDatabase 246 class provides an interface to the table in the database that contains the manufacturer status information. The CModelStatusDatabase 250 class provides an interface to the table in the database that contains the model status information. The CInfoTypeOIDDatabase 248 class provides an interface to the table in the database that contains the correspondence between the infoType enumeration and the object identifier.

CManufacturerDatabase 242, CSupportedModelDatabase 244, CComManufStatusDatabase 246, CModelStatusDatabase 250, and CInfoTypeOIDDatabase 248 are all classes derived from CRecordset 252 of the Microsoft Foundation Class (MFC) library.

The foregoing description of the preferred embodiment of the present invention has been presented for purposes of illustration and description. It is not intended to be exhaustive or to limit the invention to the precise form disclosed, and many modifications or variations are possible in light of the above teaching. For example, any one or more of the concepts described or shown herein may be applied to the system and/or method disclosed in related application No. Ser. No. 09/756,120, filed Jan. 9, 2001, entitled "Method and System of Remote Support of Device Using Email." Moreover, any concept or feature described in related application Ser. No. 09/756,120 may be applied to the systems or methods disclosed herein. The embodiments were chosen and described to best explain the principles of the invention and its practical applications thereby enable others skilled in the art to utilize the invention and various embodiments and with various modifications as are suited to the particular use contemplated. It is intended that the scope of the present invention be defined only by the claims appended hereto.

What is claimed is:

1. A method for storing information in a digital depository in a system including a monitoring device configured to extract status information from a plurality of monitored image forming devices of which there are image forming devices from at least two different vendors, said method comprising:

identifying, at the monitoring device, one of the plurality of monitored image forming devices to obtain status of;

determining, at the monitoring device, whether a vendor and model of the one of the plurality of monitored image forming devices is known to the monitoring device, whether only a vendor of the one of the plurality of monitored image forming devices is known to the monitoring device, or whether a vendor and model of the one of the plurality of monitored image forming devices is not known to the monitoring device;

storing, in the digital depository, first information usable by the monitoring device to obtain a first group of status information from all of the plurality of image forming devices in the system, of which there are image forming devices from at least two different vendors, the first information being an object identifier common to all image forming devices in the system;

storing, in the digital depository, second information usable by the monitoring device to obtain a second group of status information from only one of a plurality of vendors of the plurality of monitored image forming devices, when the one of the plurality of vendors is supported by the monitoring device, the second information being an object identifier for only a particular vendor of image forming devices;

storing, in the digital depository, third information usable by the monitoring device to obtain a third group of status information only from a particular model of an image forming device of a particular vendor, when the particular model is supported by the monitoring device, the third information being an object identifier for only a particular vendor and model of image forming devices, wherein the first information, second information, and third information are different from each other, and the first group of status information, the second group of status information, and the third group of status information are different from each other; and obtaining, at the monitoring device, status information from the one of the plurality of monitored image forming devices by using only the first information if the determining determines that the monitoring device does not know the vendor and model of the one of the plurality of monitored image forming devices, by using only the second information if the determining determines that the monitoring device knows only the vendor of the monitored image forming device of the one of the plurality of monitored image forming devices, and by only using the third information if the determining determines that the monitoring devices knows the vendor and the model of the monitored image forming device of the one of the plurality of monitored image forming devices.

2. The method of claim 1, further comprising:
accessing the digital depository, by the monitoring device, to access the first information.

3. The method of claim 1, further comprising:
accessing the digital depository, by the monitoring device, to access the second information.

4. The method of claim 1, further comprising:
accessing the digital depository, by the monitoring device, to access the third information.

5. The method of claim 1, further comprising:
storing object identifiers that identify the vendor, model, and unique identifier of the plurality of monitored image forming devices.

6. A system, comprising:
a plurality of monitored image forming devices of which there are image forming devices from at least two different vendors;

a monitoring device configured to monitor the plurality of monitored image forming device, identify one of the plurality of monitored image forming devices to obtain status of, and determine whether a vendor and model of the one of the plurality of monitored image forming devices is known to the monitoring device, whether only a vendor of the one of the plurality of monitored image forming devices is known to the monitoring device, or whether a vendor and model of the one of the plurality of monitored image forming devices is not known to the monitoring device; and a digital depository, accessible by the monitoring device, configured to store first information usable by the monitoring device to obtain a first group of status information from all of the plurality of image forming devices in the system, of which there are image forming devices from at least two different vendors, the first information being an object identifier common to all image forming devices in the system, second information usable by the monitoring device to obtain a second group of status information from only one of a plurality of vendors of the plurality of monitored image forming devices, when the one of the plurality of vendors is supported by the monitoring device, the second information being an object identifier for only a particular vendor of image forming devices, and third information usable by the monitoring device to obtain a third group of status information from only a particular model of an image forming device of a particular vendor, when the particular model is supported by the monitoring device, the third information being an object identifier for only a particular vendor and model of image forming devices, wherein the first information, second information, and third information are different from each other, the first group of status information, the second group of status information, and the third group of status information are different from each other, and the monitoring device is further configured to obtain status information from the one of the plurality of monitored image forming devices by using only the first information if the monitoring device determines that the monitoring device does not know the vendor and model of the one of the plurality of monitored image forming devices, by using only the second information if the monitoring device determines that the monitoring device knows only the vendor of the monitored image forming device of the one of the plurality of monitored image forming devices, and by only using the third information if the monitoring device determines that the monitoring devices knows the vendor and the model of the monitored image forming device of the one of the plurality of monitored image forming devices.

7. The system of claim 6, wherein the monitoring device is configured to access the digital depository to access the first information.

8. The system of claim 6, wherein the monitoring device is configured to access the digital depository to access the second information.

9. The system of claim 6, wherein the monitoring device is configured to access the digital depository, by the monitoring device, to access the third information.

10. The system of claim 6, wherein the digital depository is configured to store object identifiers that identify the vendor, model, and unique identifier of the plurality of monitored image forming devices.

* * * * *